(12) United States Patent
Masuda et al.

(10) Patent No.: US 6,400,363 B1
(45) Date of Patent: Jun. 4, 2002

(54) DRAWING CANDIDATE LINE SEGMENTS EXTRACTION SYSTEM, DRAWING CANDIDATE LINE SEGMENTS EXTRACTION METHOD, SOLID MODEL SYNTHESIS SYSTEM, AND SOLID MODEL SYNTHESIS METHOD

(75) Inventors: Hiroshi Masuda; Hirofumi Matsuzawa, both of Yamoto (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/522,861

(22) Filed: May 26, 1998

Related U.S. Application Data

(62) Division of application No. 08/534,219, filed on Sep. 26, 1995, now Pat. No. 6,104,404.

(30) Foreign Application Priority Data

Sep. 27, 1994 (JP) ............................................. 6-231911

(51) Int. Cl.$^7$ ................................................ G06T 15/00
(52) U.S. Cl. .................................................... 345/420
(58) Field of Search ............................... 345/420, 419, 345/426, 427, 428

(56) References Cited

U.S. PATENT DOCUMENTS 5,171,553 A    12/1992  Li et al. ...................... 423/239
6,078,330 A    6/2000   Masuda et al. ............. 345/420

FOREIGN PATENT DOCUMENTS

| JP | 5184244 | 7/1993 |
| JP | 5245384 | 9/1993 |
| JP | 6119463 | 4/1994 |

OTHER PUBLICATIONS

"Construction of Solid Model Using Orthographic Views with Focus on Polyhedra", *Information Processing*, vol. 31, No. 3, Aug. 1990, by Kiyoshi Ito (in Japanese, with English abstract).

*Primary Examiner*—Phu K. Nguyen
(74) *Attorney, Agent, or Firm*—Edward H. Duffield

(57) ABSTRACT

The two-dimensional coordinates of a vertex are extracted in each of a top view and front view and, if their X-coordinates are equal to each other, the combination of their Y-coordinate values is determined to be the two-dimensional coordinates of a candidate vertex in a side view. Then, candidate line segments for the side view are extracted from the line segments connecting two candidate vertices, excepting not only those line segments for which no corresponding line segment exists in the top and front views, but a so those line segments for which corresponding horizontal or vertical line segments exist in the top and front views, and which a e not horizontal or vertical in the side view.

8 Claims, 14 Drawing Sheets

| | |
|---|---|
| 10 | Solid model synthesis system |
| 14 | System memory |
| 16 | Work memory |
| 18 | Input device |
| 20 | Display |

DRAWING CANDIDATE LINE SEGMENTS EXTRACTION SYSTEM, DRAWING CANDIDATE LINE SEGMENTS EXTRACTION METHOD, SOLID MODEL SYNTHESIS SYSTEM, AND SOLID MODEL SYNTHESIS METHOD

This is a divisional of application Ser. No. 08/543,219 filed on Sep. 26, 19956 now U.S. Pat. No. 6,104,404.

FIELD OF THE INVENTION

The present invention is related to a system and method for candidate line segment generation, and to a solid model synthesis system and method. More particularly, the invention is a system for extracting candidate line segments and a candidate line segment generation method for extracting, from a first drawing and a second drawing of a solid (which are made by projecting a solid onto two planes perpendicular to each other) candidate line segments for forming a third drawing made by projecting the solid onto a plane perpendicular to each of the two planes, and to a solid model synthesis system and a solid model synthesis method for synthesizing a three-dimensional solid model, from the first and second drawings and from the third drawing made by the candidate line segments.

DESCRIPTION OF THE RELATED ART

Many manufacturers have been making drawings for design, and have been accumulating design information in the form of drawings.

However, recently, the improvement of simulation techniques and numerical control (NC) techniques has enabled the functions of an object of design to be evaluated on a computer, allowing creation of an actual prototype by transferring data to a machine tool. In this case, two-dimensional drawings are insufficient, and a solid, three-dimensional model is required. Accordingly, in recent years, three-dimensional models are often used, which store data of solids, faces, edges, and vertices in the form of a table, and have various functions such as a wire frame model display function and a surface model display function.

However, most of the conventional design information is saved in the form of drawings such as a front view, a top view, and a side view. Consequently, to evaluate the functions of an object of design on a computer, it is necessary to synthesize a solid model from such plurality of drawings in which the design information is held, but the synthesis of a solid model takes tremendous time and labor. For this, various studies have been made on a method for synthesizing a solid model from a plurality of drawings, and various solid model synthesis systems as described below have been provided.

That is, a solid model synthesis system is provided (Japanese patent number 6-119463, U.S. Pat. No. 6,078,330) in which the shape of a solid model is input in the form of three views, a front view, a top view, and a side view, to synthesize a solid model corresponding to the three views. The solid model synthesis system is characterized by having a means for obtaining, from the two-dimensional data of vertices and line segments of the figures given as the above three views, the three-dimensional data of three-dimensional line segments forming the wire frame of a solid corresponding to the figures, and further by having a means for dividing the respective regions defined by the plurality of three-dimensional line segments into cells having a boundary surface and a volume, and a means for holding the cells obtained by the division as a non-polyhedral data structure, respectively, together with a means for evaluating whether or not there is an inconsistency in the adjacency relationship between the cells with reference to the three views, and a means for synthesizing a solid model by constructing each cell based on the combination of consistent cells.

Further, the present applicant already proposed a solid model synthesis system for synthesizing a solid model from a plurality of incomplete drawings (Japanese Patent No. 5-184244). This solid model synthesis system calculates the line segments from each drawing of the plurality of incomplete drawings, constructs a wire frame model based on the calculated line segments and compares the edges of the constructed wire frame model with the line segments to correct the wire frame model. Then the corrected wire frame model is transformed to a cell division model. In addition, a condition for at least one of the three views to be correct is set by a Boolean question, and a combination of cells, which is the solution of this equation, is determined, and a solid model is synthesized based on the combination of cells.

Furthermore, the present applicant already proposed a solid model synthesis system for synthesizing a solid model from one top view and one or more sectional views(Japanese Patent Number 5-245384, U.S. Pat. No. 5,171,553). In this solid model synthesis system, input two-dimensional drawing data is classified into top view data and sectional view data. Closed regions, and the inclusion relationships between the respective closed regions, are detected from the top view data, and the attributes of the detected closed regions of the same attribute are grouped. The sectional view data is divided based on the data of the detected closed regions, and the closed regions are made three-dimensional based on the divided sectional view data. Then, of the closed regions other than the closed regions made three-dimensional, those which belong to the same group as the closed regions made three-dimensional are made three-dimensional in the same manner as the closed regions made three-dimensional. Then, based on the inclusion relationships between the respective closed regions, a solid model is synthesized by combining the respective closed regions by a set operation.

The basic method for synthesizing a solid model employed in the above various solid model synthesis systems uses the method proposed in "Construction of a Solid Model Using Orthographic Views with Focus on Polyhedra" (Information Processing, Vol. 31, No. 8, Ito Kiyoshi, 1990). In this method, first the data of three views is input, and by selecting, from the respective vertices of the three views, a combination of vertices which can be vertices on three-dimensional coordinates, thereby to synthesize three-dimensional candidate vertices. If the projection view of a line segment connecting two candidate vertices among these candidate vertices appears in all of the given three views as vertices or line segments, and no other candidate vertex exists between the two candidate vertices, then the particular line segment is held as a candidate edge. Then, a face surrounded by candidate edges on the same plane and containing therein no other candidate edge is held as a candidate face. Next, for instance, using the knowledge about a three-dimensional shape such as "All candidate vertices and candidate edges are boundaries of a candidate face," candidate vertices and candidate edges such as isolated points and hanging edges, which are inconsistent as structural elements of a solid model, are removed. Subsequently, a set of candidate faces which can be the boundaries of a solid model are searched for. Since a solid model has the restriction that every edge is shared by only two faces and structural elements do not intersect each other except on a boundary, all sets fulfilling such condition are determined, and the set of the obtained faces forms a solid model.

However, for a relatively simple design plan, only two views, a top view and a front view, may be made for convenience sake. In such case, a computer can e used to automatically make a side view from the top and front views which have already been made, and from the three views, the top, front, and side views, a solid model can be synthesized using various solid model synthesis systems as described above.

In the process step for automatically extracting candidate line segments from the top and front views in the above solid model synthesis process, the two-dimensional coordinates (Xt, Yt) of a vertex P on the top view and the two-dimensional coordinates (Xf, Yf) of a vertex Q on the front view are extracted, and a candidate vertex of the side view is determined according to a rule that a vertex R of the two-dimensional coordinates (Yt, Yf) is generated on the side view when Xt=Xf is valid, and if line segments corresponding to the line segment connecting two candidate vertices exist in the top and front views, the line segments connecting the two candidate vertices is determined to be a candidate line segment of the side view. For instance, as shown in FIG. 13, from two views in which a top view 70 and a front view 72 are both square, the four sides and the diagonal lines 76 and 78 of a square are extracted as the candidate line segments of a side view 74.

However, such a conventional candidate line segment extraction method caused the inconvenience that the number of the candidate line segments of the side view became considerably large and the time taken for the process for synthesizing a solid model greatly increased. For instance, for the process for extracting the candidate line segments of the side view from a top view 80 and a front view 82 shown in FIG. 14 which are relatively complicated, a resultant side view 84 contained a large number of candidate line segments, and a considerable amount of time was required to process them.

OBJECTS OF THE INVENTION

Accordingly, in view of the above fact, it is the first object of the present invention to provide a drawing candidate line segments extraction system and a drawing candidate line segments extraction method, in which only proper candidate line segments can be extracted from two drawings as the candidate line segments for a third drawing.

In addition, it is the second object to provide a solid model synthesis system and a solid model synthesis method, in which the extracted proper line segments are used to make the third drawing thereby for synthesizing a solid model.

BRIEF SUMMARY OF INVENTION

To accomplish these objects, and other objects as set forth more particularly in the claims, the drawing candidate line segment extraction system extracts, from a first drawing and a second drawing which are made by projecting a solid onto two planes perpendicular to each other, candidate line segments which are the candidates for line segments forming a third drawing made by projecting the solid onto a plane perpendicular to each of the two planes, characterized by comprising: a coordinate extraction means for extracting the two-dimensional coordinates of the points corresponding to vertices of the solid in each of the first the second drawings, a candidate vertices generation means for comparing the two-dimensional coordinates of the first drawing extracted by the coordinate extraction means and the two-dimensional coordinates of the second drawing extracted by the coordinates extraction means and, if the values of one coordinate determined by the relationship between the first and second drawings are equal, generating the combination of the values of the respective other coordinate as the two dimensional coordinates of candidate vertices in the third drawing, and a candidate line segment extraction means for extracting the line segments formed by connecting two candidate vertices of the candidate vertices generated by the candidate vertices generation means as candidate line segment for the third drawing in at least one of the following cases:

(1) a case in which the line segments formed by connecting two candidate vertices are horizontal or vertical in the third drawing, and line segments corresponding to the particular line segments exist in the first and second drawing, and (2) a case in which the line segments formed by connecting two vertices are not horizontal or vertical in the third drawing, line segments corresponding to the particular line segments exist in the first and second drawings, and the link segments existing in the first and second drawings are not horizontal or vertical.

To accomplish the above second object, the solid model synthesis system is characterized by comprising: a coordinate extraction means for extracting the two-dimensional coordinates of the points corresponding to vertices of a solid in each of a first drawing and a second drawing which are made by projecting the solid onto two planes perpendicular to each other, a candidate vertices generation means for comparing the two-dimensional coordinates of the first drawing extracted by the coordinate extraction means and the two-dimensional coordinates of the second drawing extracted by the coordinate extraction means and, if the values of one coordinate determined by the relationship between the first and second drawings are equal, generating the combination of the values of the respective other coordinate as the two-dimensional coordinates of candidate vertices in a third drawing generated by projecting the solid onto a plane perpendicular to each of the two planes, a candidate line segment extraction means for extracting the line segment formed by connecting two candidate vertices of the candidate vertices generated by the candidate vertices generation means as candidate line segment for the third drawing at least in one of the following cases:

(1) a case in which the line segments formed by connecting two candidate vertices are horizontal or vertical in the third drawing, and line segments corresponding to the particular line segments exist in the first and second drawings, and (2) a case in which the line segments formed by connecting two candidate vertices are not horizontal or vertical in the third drawing, and line segments corresponding to the particular line segments exist in the first and second drawings, and the line segments existing in the first and second drawings are not horizontal or vertical, a composition means for making the third drawing from the line segments which are extracted by the candidate line segments extraction means and forming the third drawing, and a solid model synthesis means for synthesizing a solid model which is a three-dimensional model, based on the first and second drawings, and the third drawing made by the composition means.

To accomplish the above second object, the solid model synthesis method is characterized in that the first and second drawings are a top view and a front view, respectively.

DESCRIPTION OF SYMBOLS

Figure 1:
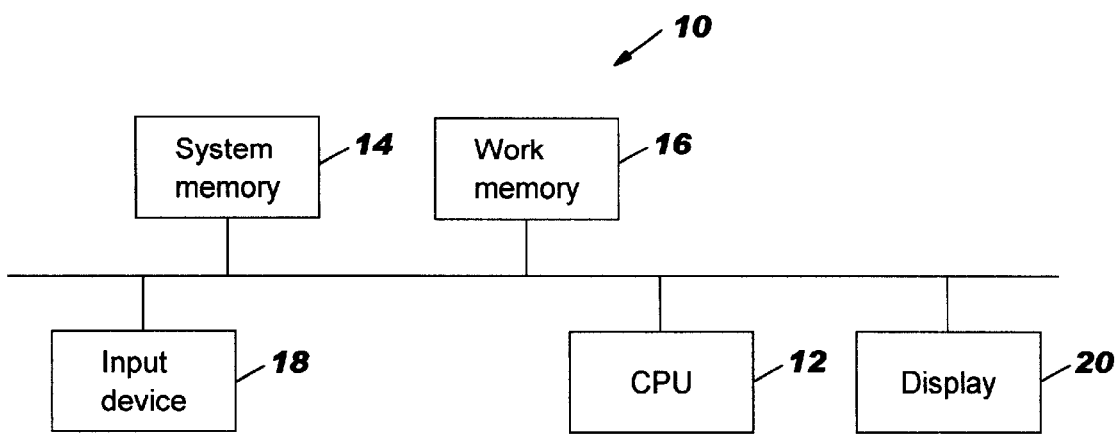
FIG. 1 is a block diagram showing the construction of the present embodiment.

| | |
|---|---|
| 10 | Solid model synthesis system |
| 12 | CPU |
| 14 | System memory |
| 16 | Work memory |
| 18 | Input device |
| 20 | Display |

DETAILED DESCRIPTION OF PREFERRED EMBODIMENT

First, the principle of the present invention is described. Generally, in making drawings representing the shape of a solid, such as machine drawings, if the solid has characteristics such as having a slant face, a plurality of projection directions is selected and drawings of the plurality of projection directions is selected and drawings of the plurality of projection directions are made so that a slanting line representing such a slant face appears on the drawings, thereby enabling the original solid shape to be identified from the drawings. Accordingly, if only horizontal or vertical line segments exist in a first drawing and a second drawing which represent the already made shape of a given solid, the particular horizontal or vertical line segments are enough to identify the shape of the solid and, in such case, it is difficult to consider that the particular solid has a slant face and the like. Thus, it can be inferred that portions represented by horizontal or vertical line segments in the first and second drawings are also represented by horizontal or vertical line segments in a third drawing.

Accordingly, for portions represented by horizontal or vertical line segments in the first and second drawings, it is only needed to select horizontal or vertical line segments of the line segments formed by connecting two candidate vertices, as candidate line segments representing the particular portions in the third drawing as well. The candidate line segments selected in this manner are very likely to be proper candidate line segments, or true line segments in the third drawing.

Further, from the foregoing, if all of the line segments represented in the first and second drawings are horizontal or vertical line segments, the portions represented by the all line segments in the first and second drawings are also represented as horizontal or vertical line segments in the third drawing. That is, in such a case, of the line segments formed by connecting two candidate vertices in the third drawing, those which are not horizontal or vertical cannot be candidate vertices.

However, in a converse case, that is, if line segments which are not horizontal or vertical are represented (existing) in the first or second drawing, the portions represented by the particular line segments are not horizontal or vertical. Thus since it can be presumed that portions which are not horizontal or vertical exist in a solid, the particular portions are probably represented by line segments which are not horizontal or vertical in the third drawing. In consequence, in this case, of the line segments formed by connecting two candidate vertices in the third drawing, those which are not horizontal or vertical probably become candidate line segments.

In accordance with the invention set forth in claim 1, when the coordinates extraction means extracts the two-dimensional coordinates of the points corresponding to vertices of a solid in each of a first drawing and a second drawing, the candidate vertices generation means compares the extracted two-dimensional coordinates of the first drawing and the extracted two-dimensional coordinates of the second drawing, and if the values of one coordinate determined by the relationship between the first and second drawings are equal, the candidate vertices generation means generates the combination of the values of the respective other coordinate as the two-dimensional coordinates of candidate vertices in a third drawing.

Figure 5A:
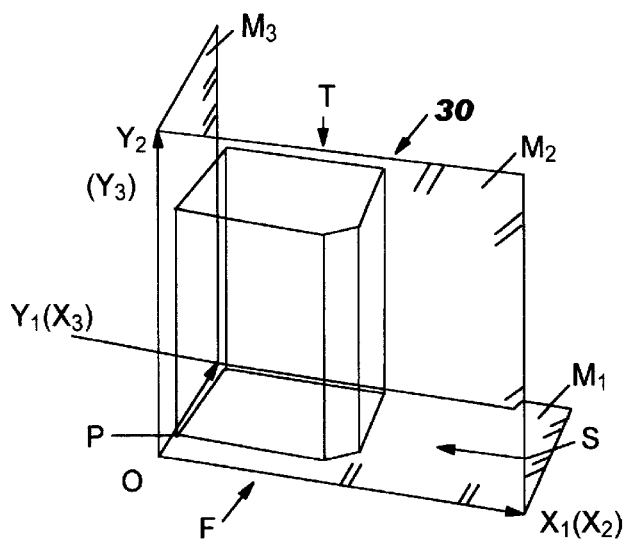
FIG. 5(A) is a perspective view of a pentagonal prism which is the object of the process for making a side view.

For instance, if the first drawing is a top view, the second drawing is a front view, and the third drawing is a side view, then, when the coordinate values of the X-coordinate are equal in the top and front views, the two-dimensional coordinates (the Y-coordinate value of the top view, the Y-coordinate value of the front view) is determined to be the two-dimensional coordinates of candidate vertices in the side view. However, the coordinates f each drawing are determined by the axes along the lines at which planes of projection M1, M2, and M3 are intersecting each other, as shown in FIG. 5(A). That is, in the top view, the line at which the planes of projection M1 and M2 are intersecting forms the X-axis (X1), and the line at which the plans of projection M1 and M3 are intersecting forms the Y-axis (Y1). In the front view, the line at which the planes of projection M1 and M2 are intersecting forms the X-axis (X2), and the line at which the planes of projection M2 and M3 are intersecting forms the Y-axis (Y2). In the side view, the line at which the planes of projection M1 and M3 are intersecting forms the X-axis (X3), and the line at which the planes of projection M2 and M3 are intersecting forms the Y-axis (Y3). (Incidentally, the axes X1 and X2, the axes Y2 and Y3, and the axes X3 and Y1 are in coincidence, respectively).

In addition, if the first drawing is a side view, the second drawing is a front view, and the third drawing is a top view, then, when the coordinate values of the Y-coordinate are equal in the side and front views, the two-dimensional coordinates (the X-coordinate values of the front view, the X-coordinate value of the side view) are determined to be the two-dimensional coordinates of candidates vertices in the top view.

Furthermore, if the first drawing is a side view, the second drawing is a top view, and the third drawing is a front view, then, when the X-coordinate value of the side view and the Y-coordinate value of the top view are equal, the two-dimensional coordinates (the X-coordinate value of the top view, the Y-coordinate value of the side view) are determined to be the two-dimensional coordinates of candidate vertices in the front view.

Then, the candidate line segments extraction means extracts the line segments formed by connecting two candidate vertices as candidate line segments for the third drawing according to the principle of the present invention, in the following three cases.

That is, the first case is that the line segments formed by connecting two candidate vertices of the candidate vertices generated by the candidate vertices generation mans are horizontal or vertical in the third drawing, and line segments corresponding to the particular line segments exist in the first and second drawings.

Further, the second case is that the line segments formed by connecting two candidate vertices are not horizontal or vertical in the third drawing, and line segments corresponding to the particular line segments exist in the first and second drawing, and the line segments existing in the first and second drawings are not horizontal or vertical.

Moreover, the third case includes both of the above first and second cases.

If candidate line segments are extracted from the line segments formed by two candidate vertices on the basis of the principle of the present invention and the particular line segments are not horizontal or vertical in the third drawing, as in the above second case, then the candidate line segments can be narrowed down on condition that corresponding line segments exist in the first and second drawings ad these corresponding line segments are not horizontal or vertical.

Further, if candidate line segments are extracted from the line segments formed by connecting two candidate vertices and the particular line segments are horizontal or vertical in the third drawing, as in the above first case, then the candidate line segments can be narrowed down on condition that corresponding line segments exist in the first and second drawings.

Furthermore, in the third case including the above first and second cases, of the line segments formed by connecting two candidate vertices, the extraction of candidate line segments for the third drawing is performed for both the line segments which are horizontal or vertical and the line segments which are not horizontal or vertical, that is, for the all line segments.

Since extraction is carried out after narrowing down the candidate line segments, only proper candidate line segments can be extracted in the first and second drawings. This also enables the processing time of the extraction process to be shortened.

In accordance with the invention set forth in claim 2, when the coordinates extraction means extracts the two-dimensional coordinates of the points corresponding to vertices of a solid in each of the first and second drawings, the candidate vertices generation means compares the extracted two-dimensional coordinates of the first drawing and the extracted two-dimensional coordinates of the second drawing and, if the values of one coordinate determined by the relationship between the first and second drawings are equal, the combination of the values of the respective other coordinate is determined to be the two-dimensional coordinates of candidate vertices in the third drawing.

Then, the candidate line segments extraction means extracts the line segments formed by connecting two candidate vertices of the candidate vertices generated by the candidate vertices generation means, excluding the following two types of line segments, as candidate line segments for the third drawing.

One of the two types of line segments is line segments which do not exist in the first and second drawings and have conventionally been removed. The other of the two types of line segments is line segments which are not horizontal or vertical in the third drawing, and for which corresponding line segments exist in the first and second drawings, and the line segment existing in the first and second drawings are horizontal or vertical. These are line segments which are in contravention of the above described rule that line segments which are not horizontal or vertical in the third drawing become line segments which also are not horizontal or vertical in the first and second drawings, the particular line segments can be excluded.

Accordingly, since the candidate line segments extraction means extracts, as candidate line segments for the third drawing, the line segments formed by connecting two candidate vertices, from which the other type of line segments of the above two types line segments have been excluded, which were not excluded in the prior art, only proper candidate line segments can be extracted from the first and second drawings. This also allows the processing time of the extraction process to be shortened.

In accordance with the invention set forth in claim 3, the first and second drawings are a top view and a front view, respectively. Generally, for a relatively simple design plan, only two views, a top view and a front view, are often made for convenience sake and, in such case, by applying the invention set forth in claim 3, only proper candidate line segments in a side view can be extracted from the top and front views as described in the invention set forth in claim 1 or in the invention set forth in claim 2. This also enables the processing time of the extraction process to be shortened.

In accordance with the invention set forth in claim 4, when the composition means makes the third drawing from the line segments extracted by the candidate line segments extraction means and forming the third drawing, as described in the invention set forth in claim 1, the solid model synthesis means synthesizes a solid model which is a three-dimensional model, based on the first and second drawings, and the third drawing made by the composition means.

Accordingly, from the first and second drawings, and the third drawing made by using the extracted proper candidate line segments, a solid model can be synthesized. In addition, this can prevent the number of solutions in the solid model synthesis process from becoming tremendously large, or can prevent the processing time from becoming abnormally long.

In accordance with the invention set forth in claim 5, when the composition means makes the third drawing from the line segments extracted by the candidate line segments extraction means and forming the third drawing, as described in the invention set forth in claim 2, the solid model synthesis means synthesizes a solid model which is a three-dimensional model, based on the first and second drawings, and the third drawing made by the composition means.

Consequently, from the first and second drawings, and the third drawing made by using the extracted proper candidate line segments, a solid model can be synthesized. Also, this can prevent the number of solutions in the solid model synthesis process from becoming tremendously large, or can prevent the processing time from becoming abnormally long.

In accordance with the invention set forth in claim 6, the first and second drawings are a top view and a front view, respectively. Generally, for a relatively simple design plan, only two views, a top and front views, are often made for convenience sake. In such a case in which the two views, the top and front views, are made, by applying the invention set forth in claim 6, a solid model can be synthesized from the top and front views, and a side view made by using the extracted proper candidate line segments, as described in the inventions set forth in claims 4 and 5. Also, this can prevent the number of solutions in the solid model synthesis process from becoming tremendously large, or can prevent the processing time from becoming abnormally long.

Since the inventions set forth in claims 7 to 12 which are corresponding to the inventions set forth in claims 1 to 6 have the same action as that of the inventions set forth in claims 1 to 6, and the description of them is omitted.

Embodiment

An embodiment of the present invention will now be described. The present embodiment extracts candidate line segments formed from two views, a front view and a top view, which are made by projecting a solid onto two planes perpendicular to each other, makes a side view from the extracted candidate line segments, and based on these three views, synthesizes a solid model for the solid.

As shown in FIG. 1, a solid model synthesis system 10 comprises a CPU 12, a system memory 14, a work memory 16, an input device 18, and a display 20, which are interconnected through a bus. In the system memory 14, a later described control routine executed by the CPU 12 is stored. Also, in the work memory 16 stores various data on the drawings which are previously input from the input device 18 consisting of an image scanner, a keyboard, and the like, for instance, the coordinate data of the start and end points of line segments of the two views.

The solid model synthesizing routine of the present embodiment will now be described.

Figure 2:
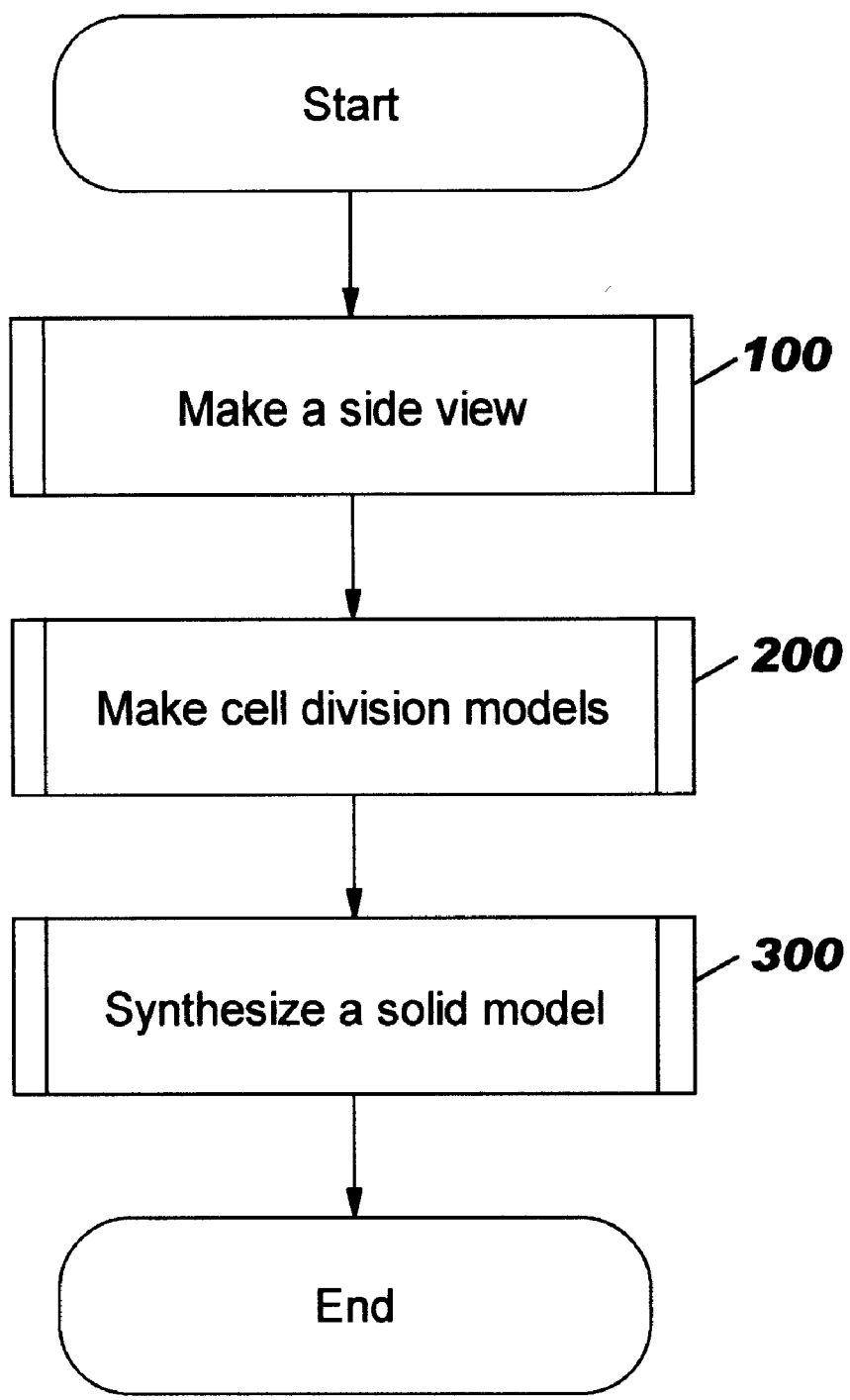
FIG. 2 is a flowchart showing the main routine of the control of the present embodiment.

As shown in FIG. 2, the routine of the present embodiment roughly consists of three steps. That is, in step 100, candidate line segments formed from the two views, the top and front views, are extracted and a side view is made from the extracted candidate line segments and, in the next step, 200, a cell division model is made from the three views, the top, front, and side views. In the next step, 300, a solid model is synthesized by determining a combination of the cell division models on a condition that the side view may include unnecessary line segments and hence may not be correct, but the top and front views are correct.

First, the routine for making the side view in step 100 is described using FIGS. 3 to 6.

Figure 5B:
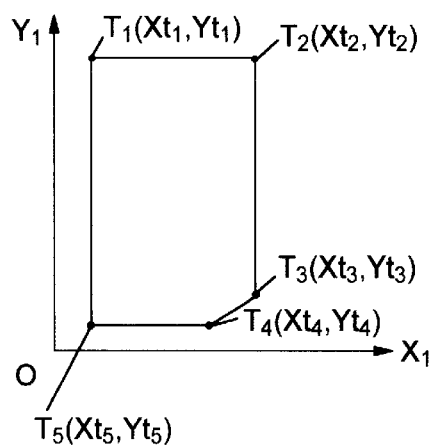
FIG. 5(B) is a top view of the pentagonal prism.
Figure 5C:
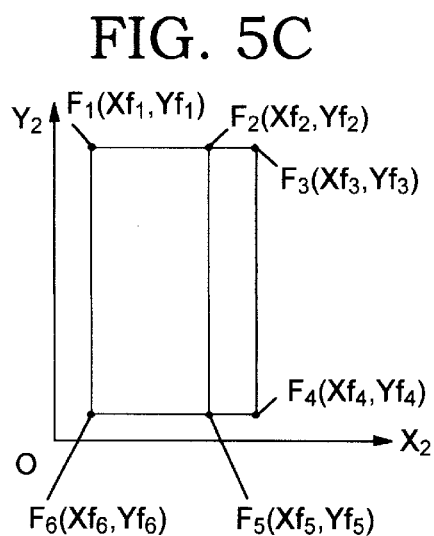
FIG. 5(C) is a front view of the pentagonal prism.

The following description is made by taking, as an example, a process in which a side view, when a pentagonal prism 30 shown in FIG. 5(A) is projected onto a plan of projection M3 from the direction of arrow S, is made from a top view shown in FIG. 5(B) when the pentagonal prism 30 is projected onto a plane of projection M1 from the direction of arrow T, and a front view shown in FIG. 5(C) when the pentagonal prism 30 is projected onto a plane of projection M2 from the direction of arrow F.

In this case, a point at which the planes of projections M1, M2, and M3 are intersecting each other as shown in FIG. 5 (A) is set as a common original point, and the coordinate axes in each of the top, front, and side views are set as follows.

As the X-axis in the top view, an axis X1 along the intersecting line of the planes of projections M1 and M2 is set, and an axis Y1 is along the intersection line of the planes of projection M1 and M3 is set as the Y-axis. Further, as the X-axis in the front view, an axis X2 along the intersecting line of the planes of projection M1 and M2 is set, and an axis Y2 along the intersecting line of the planes of projection M2 and M3 is set as the Y-axis. Furthermore, as the X-axis in the side view, an axis X3 along the intersecting line of the planes of projection M1 and M3 is set, and an axis Y3 along the intersecting line of the planes of projection M2 and M3 is set as the Y-axis. In addition, the axis X1 and the axis X2 are in coincidence, the axis Y2 and the axis Y3 are in coincidence, and the axis Y1 and the axis X3 are in coincidence.

Figure 3:
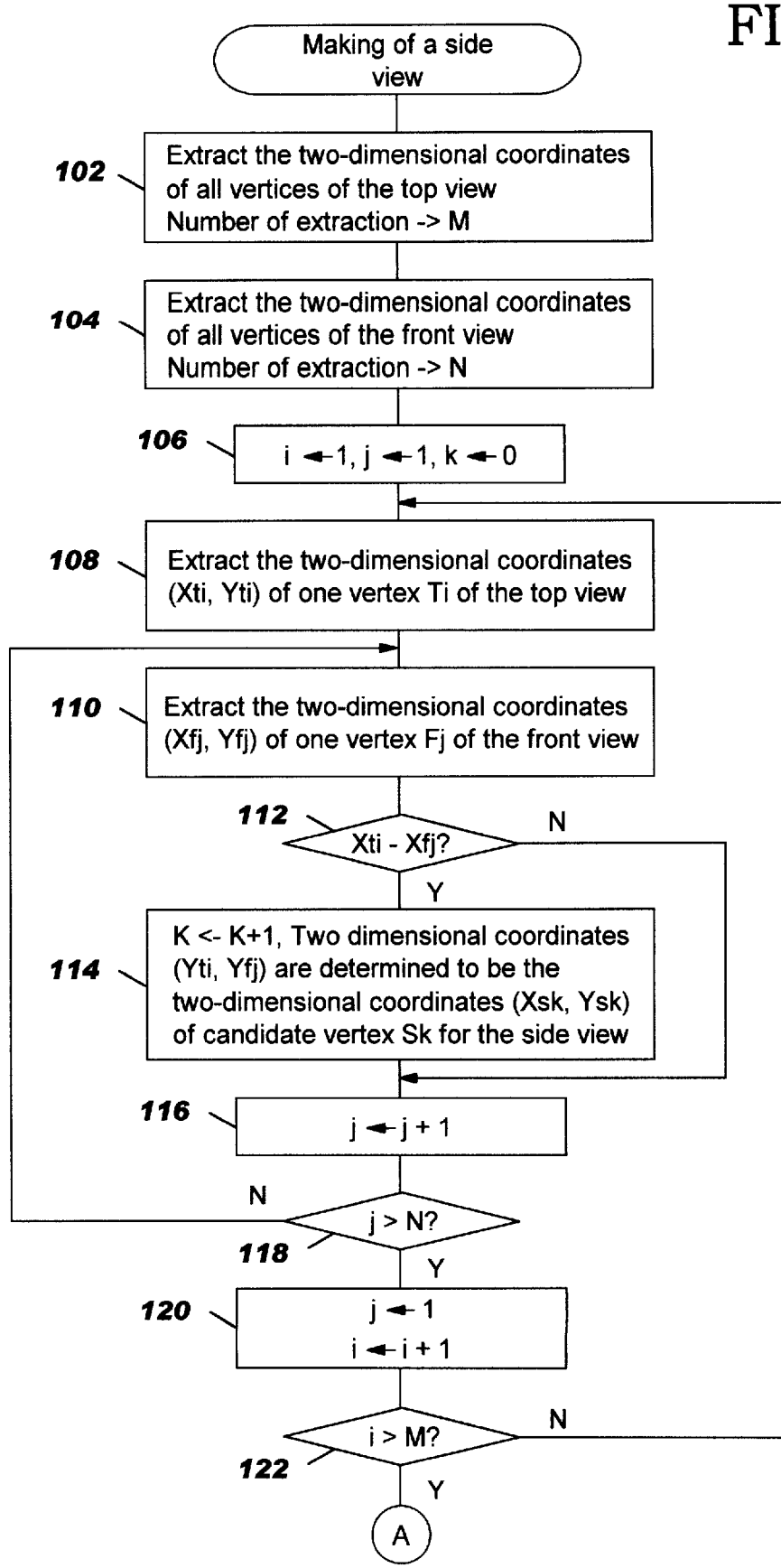
FIG. 3 is a flowchart showing the first half of the process for making a side view.
Figure 4:
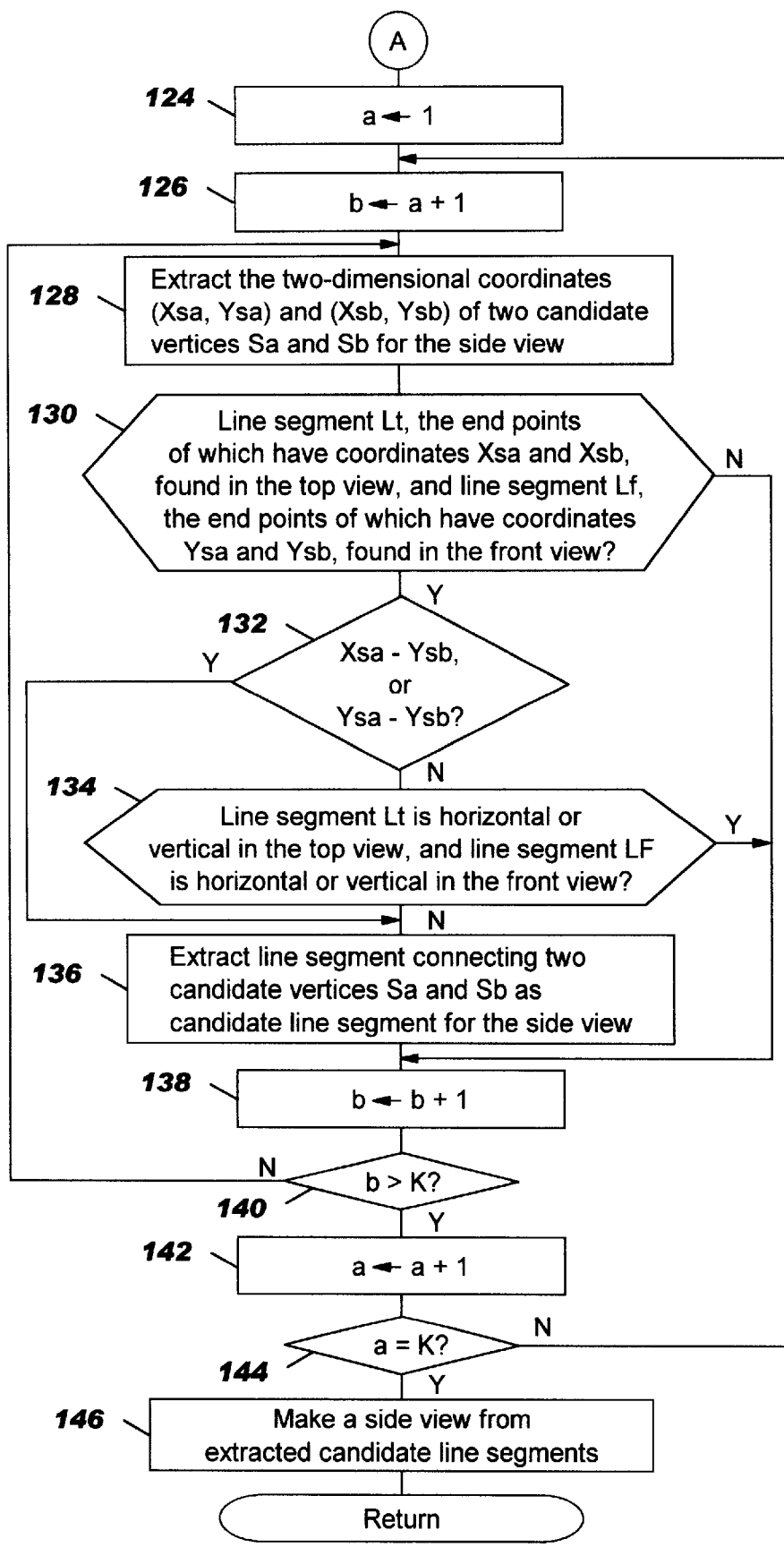
FIG. 4 is a flowchart showing the second half of the process for making a side view.
Figure 5D:
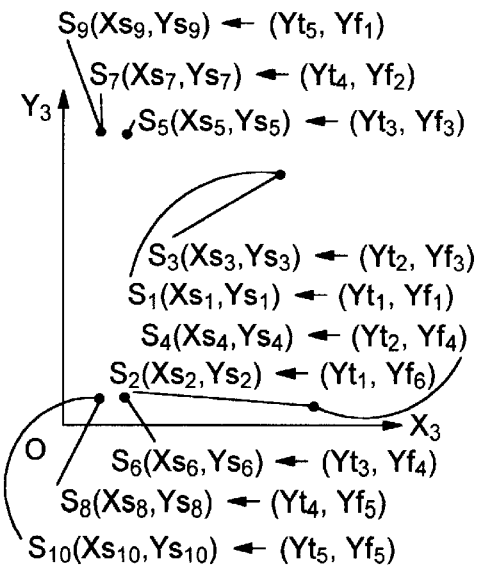
FIG. 5(D) is a figure showing the candidate vertices of the side view of the pentagonal prism.

In step 102 shown in FIG. 3, the two-dimensional coordinates of all vertices of the top view shown in FIG. 5(B) are extracted, and the extracted two-dimensional coordinates are stored in the work memory 16. Further, the number of the extracted two-dimensional coordinates is substituted into a variable M. In addition, vertices mean the points corresponding to vertices of a solid, and the vertices described below have the same meaning as this, In the next step, 104, the two-dimensional coordinates of all vertices of the front view shown in FIG. 5(C) are extracted, and the extracted two-dimensional coordinates are stored in the work memory 16. Further, the number of the extracted two-dimensional coordinates is substituted into a variable N. Then, in the next step, 106, a counter is used for extracting the two-dimensional coordinates of vertices of the top view and a counter j used for extracting the two-dimensional coordinates of vertices of the front view are set to one, and a counter k for counting the number of candidate vertices for the side view shown in FIG. 5(D) is set to zero, and thereafter the process goes to step 108.

In step 108, the two-dimensional coordinates (Xti, Yti) of one vertex Ti of the top view are extracted, and in the next step 110, the two-dimensional coordinates (Xfj, Yfj) of one vertex Fj of the front view are extracted. Then in the next step 112, whether or not Xti=Xfj is determined, and if Xti=Xfj, the process goes to step 114 where the counter k is incremented, and the two-dimensional coordinates (Yti, Yfj) are determined to be the two-dimensional coordinates (Xsk, Ysk) of a candidate vertex Sk f the side view. If Xti=Xfj is not valid, the process jumps to step 116.

That is, the two-dimensional coordinates (Xt1, Yt1) of a vertex T1 of the top view shown in FIG. 5(B) and the two-dimensional coordinates (Xf1, Yf1) of a vertex F1 of the front view shown in FIG. 5(C) are extracted, and the X-coordinates are compared. Since Xt1=Yf1, the determination in step 112 becomes positive and, in step 114, the two-dimensional coordinates (Yt1, Yf1) are determined to be the two-dimensional coordinates (Xs1, Ys1) of a candidate vertex S1 of the side view, as shown in FIG. 5(D).

In step 116, the counter j is incremented, and in the next step 118, it is determined whether or not the counter j is larger than the number N of all vertices of the front view. If j>N is not valid, the process returns to step 110 for rerun. By this, all of the N number of vertices Fj (Xfj, Yfj) of the front view are matched one by one with one vertex Ti (Xti, Yti) of the top view which was extracted in the above step 108, and their x-coordinates are compared in step 112.

That is, the two-dimensional coordinates of vertices F2 to F6 of the front view shown in FIG. 5(C) are sequentially extracted, and the X-coordinates are compared between each of them and the two-dimensional coordinates (Xt1, Yt1) of the vertex T1. Since Xt1=Xf6, and Xt1 is not equal to Xf2, Xf3, Xf4 and Xf5, the two-dimensional coordinates (Yt1, Yf6) are determined to be two-dimensional coordinates (Xs2, Ys2) of a candidate vertex S2 of the side view as shown in FIG. 5(D).

Further, if j>N, the process goes to step 120 where the counter j is set to one and counter j is incremented. In the next step 122, it is determined whether or not the counter is larger than the number M of all vertices of the top view. If i>M is not valid, the process returns to step 108 for rerun. Further, if i>M, the process goes to step 124. In the execution of the above steps 108 to 122, for all combinations of the two-dimensional coordinates (Xti, Yti) of all five vertices Ti of the top view shown in FIG. 5(B) and the two-dimensional coordinates (Xfj, Yfj) of all six vertices of the front view shown in FIG. 5(C), the X-coordinates are compared in step 112 and, if the X-coordinates are equal to each other, then, in step 114, the two-dimensional coordinates (Yti, Yfj) are determined to be the two-dimensional coordinates (Xsk, Ysk) of the candidate vertex Sk of the side view. As shown in FIG. 5(D), the two-dimensional coordinates of ten candidate vertices are determined as shown in FIG. 5(D), and 10, the number of the candidate vertices, is substituted into the counter k.

In step 124, one is set in a counter a used for extracting two candidate vertices of the side view, to be described later, and in the next step 126, the value (the value of counter a plus one) is set in a counter b which is also used for extracting two candidate vertices.

In the next step 128, the two-dimensional coordinates (Xsa, Ysa) and (Xsb, Ysb) of two candidate vertices Sa and Sb of the side view and, in the next steps, 130, 132 and 134, the following determination is performed.

In step 130, by determining whether or not a line segment Lt the end points of which have Y-coordinates Xsa and Xsb exists in the top view and a line segment Lf the end points of which have Y-coordinates Ysa and Ysb exists, it is determined whether or not line segments corresponding to the line segments connecting the two candidate vertices Sa and Sb exist in the top view and the front view. However, even if the line segments Lt and Lf corresponding to the top and front views exist, respectively, when the line segments are obviously not line segments obtained by projecting the same line segment, that is, when the X-coordinate values of the end points are not coincidence in the line segments Lt and Lf, it cannot be said that line segments corresponding to the line segment connecting the above two candidate vertices Sa and Sb consistently exist in the top and front views, and thus the determination is negative. In step 132, it is determined whether or not Xsa=Xsb or Ysa=Ysb, that is, whether or not the line segment connecting the two candidate vertices Sa and Sb is horizontal or vertical in the side view. Further, in step 134, it is determined whether or not the line segment Lt is horizontal or vertical in the top view and the line segment Lf is horizontal or vertical in the front view.

In the determinations in the above three steps, if the determinations in steps 130 and 132 are positive, or if the determination in step 130 is positive and the determination in steps 132 and 134 is negative, then the process goes to step 136 to extract the line segment connecting the two candidate vertices Sa and Sb as a candidate line segment for the side view. In this case, the process branches to step 138.

Figure 6A:
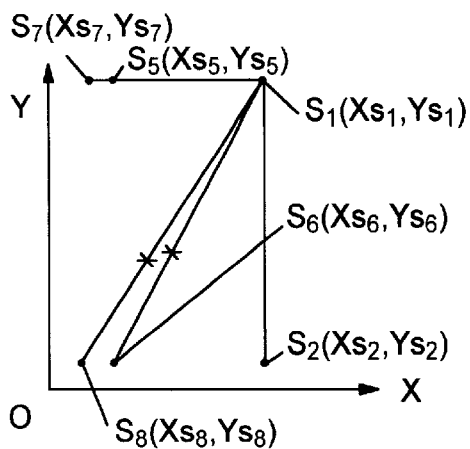
FIGS. 6(A) to (C) show states of the candidate line segments extraction process for the side view still in progress.

That is, first, in step 128, the two-dimensional coordinates (Xs1, Ys1) and (Xs2, Ys2) of two candidate vertices S1 and S2 shown in FIG. 6(A) are extracted and, in step 130, it is determined whether or not a line segment Lt the end points of which have Y-coordinates Xs1 and Xs2 exists in the top view and a line segment Lf the end points of which have Y-coordinates Ys1 and Ys2 exists in the front view. Since Xs1=Xs2=Yt1, the vertex T1 shown in FIG. 5(B) corresponds to the line segment Lt having a length of zero, and thus the line segment Lt exists in the top view. Also, since Ys1 Yf1 and Ys2=Yf6, the line segment connecting the vertices F1 and F6 shown in FIG. 5(C) corresponds to the line segment Lf, and thus the line segment Lf exists in the front view. In addition, the above line segments Lt (vertex T1) and Lf are not inconsistent as line segments representing the same line segment. Accordingly, the determination in step 130 is positive, and the process goes to step 132. The determination in step 132 becomes positive since Xs1=Xs2=Yt1, and the process skips to step 136 where the line segment connecting the two candidate vertices S1 and S2 is extracted as a candidate line segment for the side view, as shown by a solid line in FIG. 6(A).

In step 138, the counter b is incremented and, in the next step, 140, it is determined whether or not the counter b is larger than the number K of the candidate line segments for the side view. If b>K is not fulfilled, the process returns to step 128 for rerun. The processing in above steps 128 to 140 is carried out for each of the combinations of the two-dimensional coordinates of two candidate vertices S1 and Sb (b: an integer of 3 to 10).

When the two-dimensional coordinates of the two candidates vertices S1 and S3 are extracted, Xs3=Yt1=Xs1=Yt2 and Ys1=Yf1=Ys3=Yf3, and thus, in step 130, the line segment Lt connecting the vertices Ti and T2 shown in FIG. 5(B) and the line segment Lf connecting the vertices F1 and F3 shown in FIG. 5(C) exist. In addition, the line segments Lt and Lf are not inconsistent as line segments representing the same line segment. In consequence, the determination in step 130 is positive, and the determination in step 132 becomes positive as is obvious from the above equations, causing the process to skip to step 136. In step 136, the line segment (actually, a vertex) connecting the two candidate vertices S1 and S3 and having a length of zero is extracted.

Similarly, the above described processing is performed for the two-dimensional coordinates of the two candidate vertices S1 and S4 and the two-dimensional coordinates of the two candidate vertices S1 and S5.

Then, when the two-dimensional coordinates of the two candidate vertices S1 and S6 are extracted, Xs1=Yt1, Xs6=Yt3, and Yt1=Yt2 in step 130, and thus the line segment Lt connecting the vertices T2 and T3 sown in FIG. 5(B) exists.

In addition, since Ys1=Yf1, Ys6=Yf4, and Yf1=Yf3, the line segment Lf connecting the vertices F3 and F5 are shown in FIG. 5(C) exists. Further, the above line segments Lt and Lf are consistent as line segments representing the same line segment. In consequence, the determination in step 130 becomes positive, and the process goes to step 132. The determination in step 132 becomes negative since Xs1 and Xs6, and Ys1 and Ys6 are not equal, and the determination in the next step, 134, is positive since the line segment connecting the vertices T2 and T3 existing in the top view and the line segment connecting the vertices F3 and F4 existing in the front view are vertical. Accordingly, the candidate line segments extraction process in step 136 is bypassed, and the line segment connecting the two candidate vertices S1 and S6 is not extracted as a candidate line segment, as shown by the "X" mark in FIG. 6(A).

Similarly, the processing for up to the two-dimensional coordinates of the two candidate vertices S1 and S10 is performed and as a result, the line segments shown by solid lines in FIG. 6(A) are extracted. In addition, the line segment connecting the two candidate vertices S1 and S8 is not extracted as a candidate line segment, as is the case with the candidate line segment connecting the above two candidate vertices S1 and S6.

Since b=10 when the processing for the two-dimensional coordinates of the two candidate vertices S1 and S10 is carried out, b equals 11 when it is incremented in step 138, and the determination in step 140 is positive since it is larger than the value of K, 10. Then, the process goes to step 142 to increment the counter a, and in the next step, 144, it is determined whether or not the counter a is equal to the number K of the candidate line segments for the side view. If a=K is not fulfilled, the process returns to step 126 for rerun.

Figure 6B:
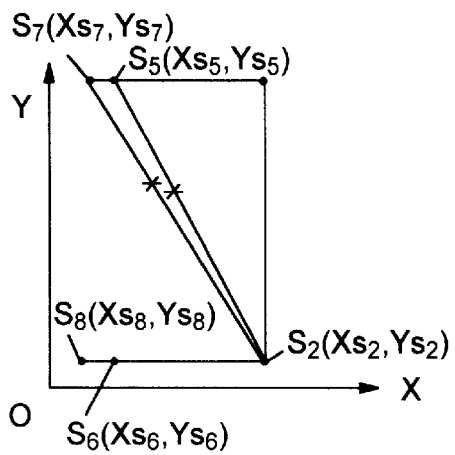
Figure 6C:
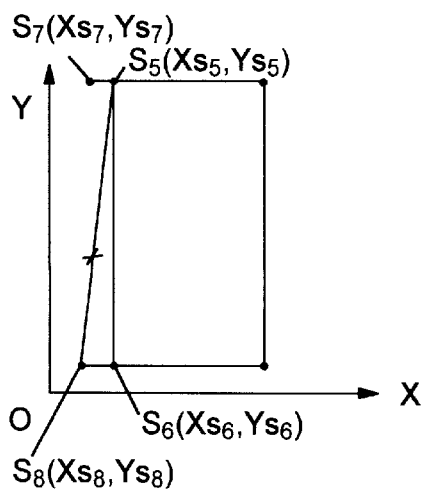

That is, the value of the counter a is set to 2 in step 142 and, for each of the combinations of the two-dimensional coordinates of two candidate vertices S2 and Sb (b: an integer of 3 to 10), the processing of the above steps 128 to 140 is executed. As a result, the candidate line segments shown by solid lines in FIG. 6(B) are extracted. However, the line segment connecting the two candidate vertices S2 and S5 and the line segment connecting the two candidate vertices S2 and S7 are not extracted as candidate line segments, as shown by the "X" mark.

By incrementing or determination of counters in the above steps 126, 138, 140, 142, and 144, all of the two-dimensional coordinates of the two candidate vertices for the side view are combined, and the processing in steps 128 to 136 is performed for each of them.

During this processing, when the two-dimensional coordinates of the two candidate vertices S5 and S8 are extracted, Xs5=Yt3 and Xs8=Yt4 in step 130, and thus the line segment Lt connecting the vertices T3 and T4 shown in FIG. 5(B) exists. In addition, since YS5=Yf3, Ys8=Yf5, and Yf5=Yf4, the line segment Lf connecting the vertices F3 and F4 shown in FIG. 5(c) exists. However, the X-coordinates of the respective end points of the line segments Lt and Lf are not in coincidence, and thus they cannot be line segments for the same line segment in the top and front views. Accordingly, it cannot be said that line segments corresponding to the line segment connecting the two candidate vertices S5 and S8 consistently exist in the top and front views, and thus the determination in step 130 becomes negative. Accordingly, the candidate line segments extraction process in step 136 is bypassed, and the line segment connecting the two candidate vertices S5 and S8 is not extracted as a candidate line segment, as shown by the "X" mark in FIG. 6(C).

Figure 6D:
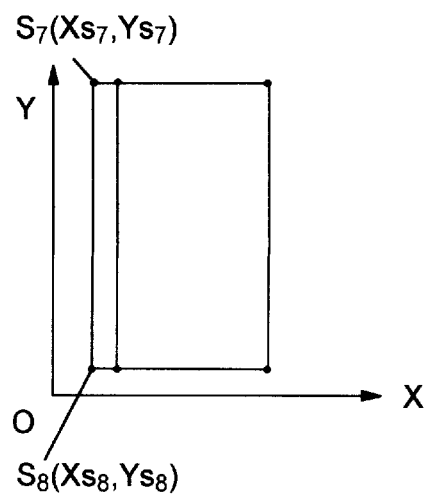
FIG. 6(D) shows the result of the candidate line segments extraction process for the side view.

When all two-dimensional coordinates of two candidate vertices for the side view are combined and the above processing is completed, the candidate line segments shown in FIG. 6(D) are extracted. Thereafter, the process goes to step 144 in which determination becomes positive and, in the next step, 146, a side view is made from the extracted line segments, and the process returns to the main routine.

Figure 7:
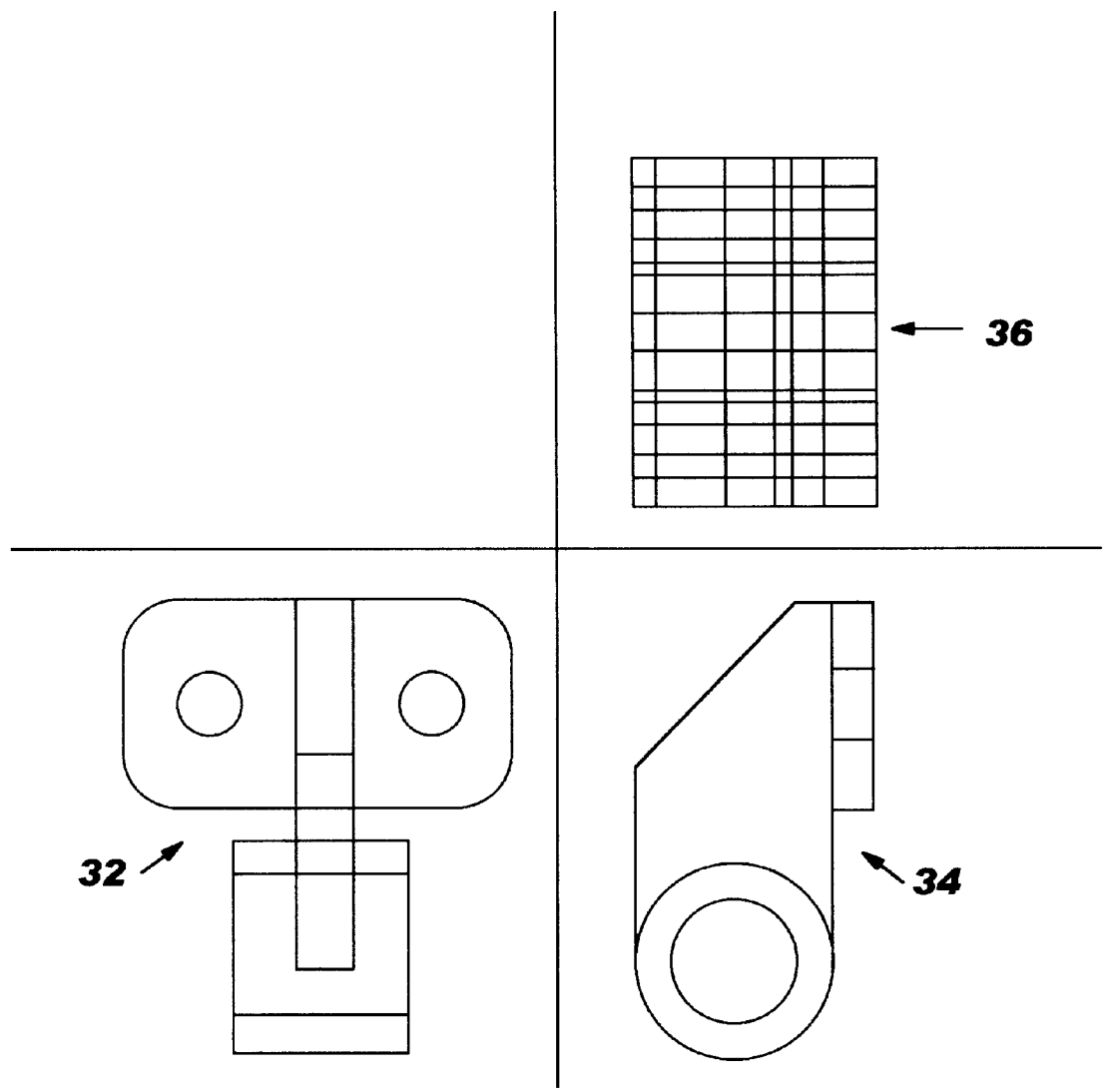
FIG. 7 is a figure showing an example in which the present invention was applied to relatively complicated top and front views to make a side view.
Figure 14:
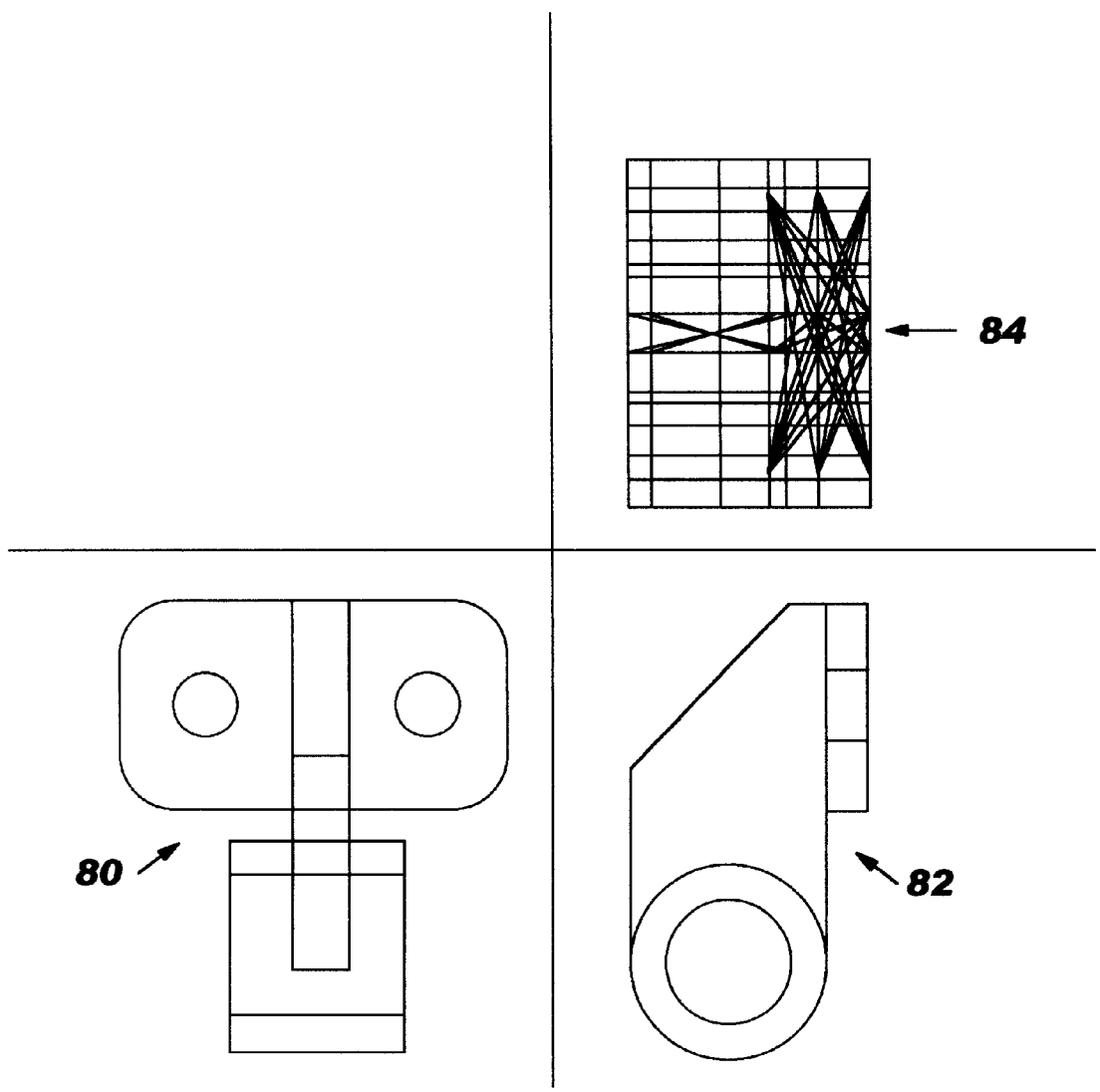
FIG. 14 shows an example in which a side view was made from relatively complicated top and front views based on the conventional method.

In addition, as shown in FIG. 7, the method for extracting the candidate line segments for the side view as described above is applied to the top view 32 and the front view 34 described in the prior art, a side view 36 is obtained. As compared with the side view 84 shown in FIG. 14, the side view 36 is a side view in which obviously useless line segments are excluded. Incidentally, the process for obtaining the side view 84 shown in FIG. 14 by the prior method spent 248 seconds as an actual CPU processing time, whereas the process for obtaining the side view 36 shown in FIG. 7 by the method of the present invention only took 11 seconds as an actual CPU processing time. That is, the actual CPU processing time decreased to less than $\frac{1}{20}$.

Figure 8:
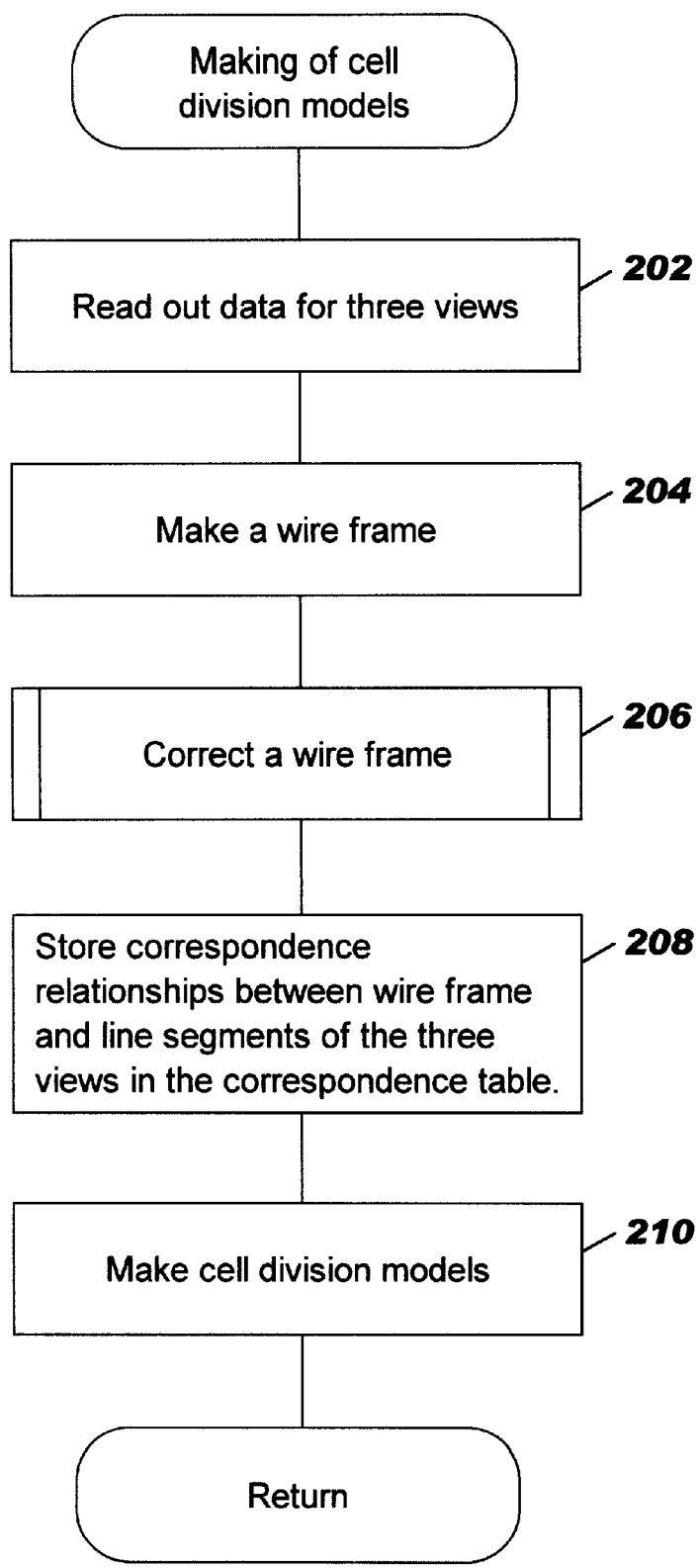
FIG. 8 is a flowchart showing the processing for making cell division models.
Figure 9:
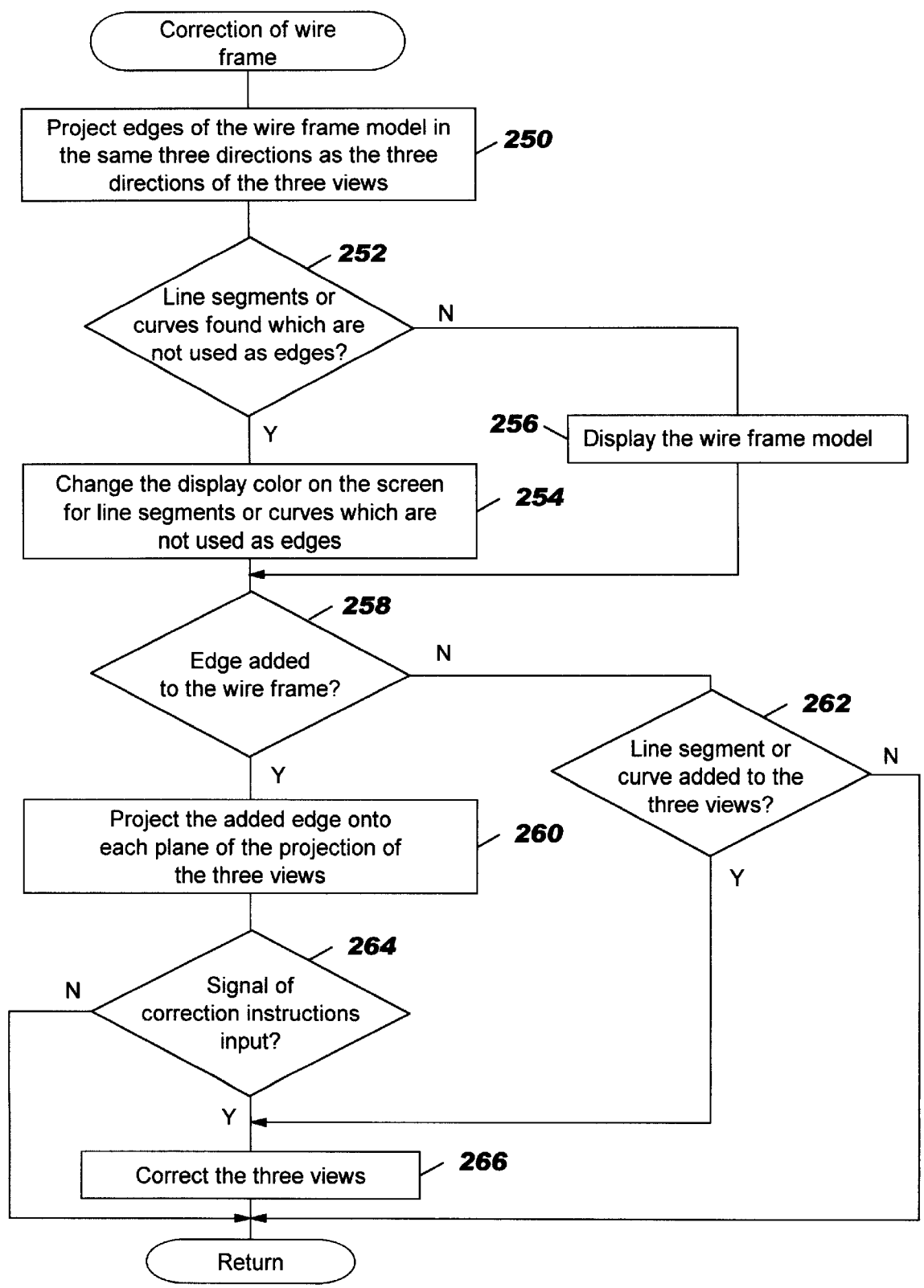
FIG. 9 is a flowchart showing the process for correcting a wire frame.

The subroutine of the process for making cell division models in step 200 shown in FIG. 2 will now be described using FIGS. 8 to 10.

In step 202 shown in FIG. 8, the coordinate data of the start and end points of the line segments or curves (hereinafter referred to as "line segments and the like") in the side view made in the above side view composition routine and the two views, the top and front views, are read from the work memory 16, and in the next step, 204, a wire frame is made by the procedure described below. The method for making the wire frame employs the method proposed in "Construction of a Solid Model Using Orthographic Views with Focus on Polyhedra" (Information Processing, Vol. 31, No. 8, Kiyoshi Ito, 1990), as described above.

That is, first, from the vertices of the front view (X-Y plane), the top view (X-Y plane) and the side view (Y-Z plane), arbitrary points vf (xf, Yf), vt (xt, zt), and vs (ys, zs) are selected, respectively. If xf=xt, yf=ys, and zt=zs are valid fr the coordinates of each selected point, candidate vertices (xf, yf, zt) becoming candidates for a solid model are determined from these three vertices. Such combination is sought for all vertices.

Then, whether or not the line segments and the like between the candidate vertices are valid as candidate edges becoming candidates for the edges of a solid model is examined by whether or not they satisfy the following conditions (1) to (3).

$$vf1=vf2 \text{ or linked } (vf1, vf2 \ldots) \tag{1}$$

$$vt1=vt2 \text{ or linked } (vt1, vt2 \ldots) \tag{2}$$

$$vs1=vs2 \text{ or linked } (vs1, vs2 \ldots) \tag{3}$$

vf1 and vf2 represent two vertices of the front view, vt1 and vt2 represent two vertices of the top view, and vs1 and vs2 represent two vertices of the side view, and the three-dimensional candidate vertices obtained from these are P1 and P2.

Further, the conditions at left in these conditional expressions (1) to (3), or vf1=vf2 and the like indicate the case in which the points on the three views which correspond to the candidate vertices P1 and P2 exist as the same point in one drawing. (Incidentally, "three views" is usually used as the generic name for the three completed views, top, front, and side views, but, in this embodiment, the top view, the front view, and the side view which is made by the above side view composition routine and may include unnecessary line segments are generally called "three views" for convenience sake.) In the following cases, this forms the condition for the line segments and the like between candidate vertices which are valid as candidate edges becoming candidates for the edges of a solid model. For instance, the candidate vertices P1 and P2 exist as the same point on the front view (X-Y plane) and satisfy the condition of vf1=vf2 when the line segment connecting the candidate vertices P1 and P2 is parallel with the Z-direction. The reason is that the line segment is parallel with the X-direction, and it exists as the same point if it is projected onto the front view which is the X-Y plane.

In addition, the conditions at right, linked (Vf1, Vf2) and the like, represent the line segments and the like connecting the three-dimensional candidate vertices P1 and P2 exist in one drawing of the three views. Whether or not these conditions are satisfied is determined for between all three-dimensional candidate points, and the line segments and the like between the three-dimensional candidate points satisfying these conditions are held as candidate edges.

Then, of the candidate edges held in such manner, those which cannot be the edges of a solid model are removed. That is, first, an edge of a solid model always connects with other edges, because the edge is a boundary line or intersecting line of a plane by which the solid model forms an outline partitioning the space. Thus, an edge the end points of which is not connecting with other edge, which means the case in which the edge is not connecting with other edges and simply hanging from other edges, is not valid as a candidate edge, and it is removed.

By the above process, the three-dimensional coordinates of both end points of a line are stored in the work memory 16 in the form of a table, and thus each edge is determined, by which a wire frame representing the framework of an object, just as a wire frame, is generated.

In the next step, 06, the wire frame is corrected. This process is to supplement the missing edge of a wire frame model, if any. This process is described with reference to the subroutine shown in FIG. 9. First, in step 250, the edges of a wire frame model are projected in the same three directions as the three directions of the three views. In the next step, 252, it is determined whether or not there exist line segments and the like of the three views which are not used as the edges of the wire frame model. If they exist, such line segments and the like are probably missing in other drawings, and thus, in the next step, 254, the display colors on the display for the probably missing line segments and the like are changed, and the operator is informed of the particular line segments and the like.

In the next step, 258, it is determined whether or not an edge was added to te wire frame and, if added, then, in the next step, 260, the added edge is projected onto each plane of projection of the three views for verification. In the subsequent step, 264, it is determined whether or not the signal of the correction instructions by the operator has been input, and if it has been input, the original three view are corrected in the next step, 266, and the process returns from this subroutine.

Although, in this example, the line segments and the like which are probably missing are supplemented by adding edges to the wire frame to correct the wire frame, the method for correcting the wire frame is not limited to this method, but a method may also be employed in which the line segments and the like missing in other drawing are added to the particular drawing. Then, if no edge was added to the wire frame in step 258, it is determined in step 262 whether or not line segments and the like were added to the three views.

If line segments and the like were added to the three views, the process goes to step 266 to correct the three views. Further, even if there are line segments and like which exist in a certain drawing, but are missing in other drawing, the operator may decide that the particular line segments and the like need not exist, after referring to the wire frame model. Then, in step 262, if line segments and the like were not added to the three views, the process returns from;this subroutine.

Further, if there are existing line segments and the like which are missing in all of the three views, there is consistency in the correspondence relationship between the wire frame and the three views and it is not determined that missing line segments and the like exist, but a remarkable number of missing line segments and the like may exist in the wire frame model. Then, if it is determined in step 252 that there are no existing line segments and the like which are not used as the edges of the wire frame model, the process goes to step 256 to display the wire frame model. Then, by performing the processing in the above step, 258, and in subsequent steps, the operator checks such remarkable numbers of missing line segments and the like on the screen, and corrects the wire frame model by adding edges to the wire frame or adding line segments and the like to the original three views.

In the next step, 208 (FIG. 8)., the correspondence relationship between the wire frame and the three views is stored in a correspondence table and, in the next step, 210, the generation of cell division models is carried out.

Only with the wire frame model, only the coordinates of edges merely expressing the framework of a solid are obtained, and they are incomplete as information for expressing a solid. Accordingly, they may be interpreted as expressing another solid model and, thus, to the coordinates of the edges expressing the framework of the solid, it is needed to add the information on the surface surrounded by the edges.

Then, a surface model is generated from the wire frame model.

Figure 10A:
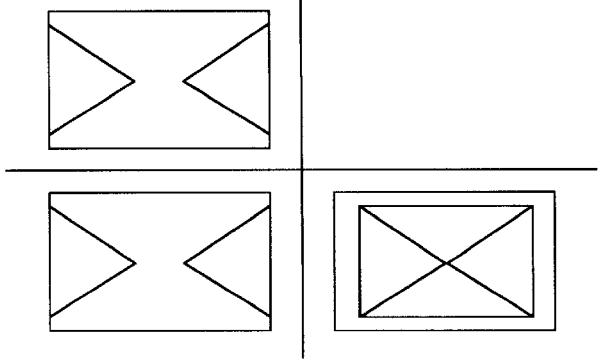
FIGS. 10(A) to (E) show the process for generating cell division models.
Figure 10B:
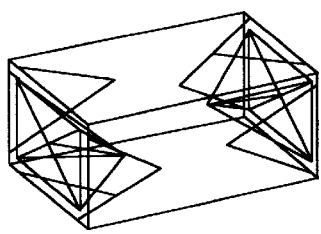

This is described with reference to FIG. 10. In the FIG. 10(A), the three views based on the input coordinate data are shown, and the wire frame model generated based on the coordinate data is shown in FIG. 10(B). The process for making a surface model from the wire frame mode is described below.

Figure 10C:
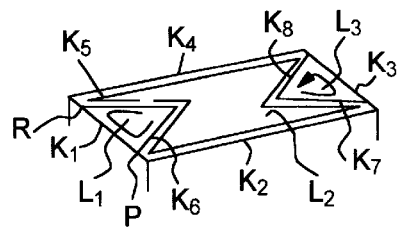

That is, as shown in FIG. 10(C), the edges K1 to K8 of the wire frame model are traced to search the loop L1 to L3 on the same plane. In this process, if the normal to the plane is appropriately determined and the nearest edges as seen counterclockwise are sequentially traced, the counterclockwise minimum loops L1 to L3 including no other candidate edge within the plane can be obtained. For instance, other edge K6 connecting at the other vertex P of an edge K1 beginning at a vertex R is retrieved, and a further edge K5 connecting at the other vertex Q of the edge K6 is retrieved. By this retrieval, the minimum loop L1 formed by the edges K1, K6, and K5 is obtained. Faces are defined in the minimum loops L1 to L3 obtained in this way. These defined faces are labeled S1, S2, and S3 . . . . By this, the information on each of the vertices, edges and faces of a solid can be obtained in the form of a table. Further, by adding the defined face on the same plane and the face on other plane by a set operation, for instance, for FIG. 10(D), a face S1 is defined on the front side of a solid model and a face S2 is defined on the top side of the solid model, and faces S3 and S4 are defined on the corresponding opposite sides, respectively. Also, five faces (S5 to S9) are defined on the left face, five faces (S10 to S14) are defined on the right face, and eight faces are defined within the solid (on the left and right face sides), thereby generating a surface model having 22 faces defined therein.

A structural relationship between the particular face and the adjacent face, cannot be determined, however, only with information on faces, which side of a certain-face is inside or outside of a solid. Thus, cell division models (FIG. 10(E)) are generated next from the surface model (FIG. 10(D)).

Figure 10D:
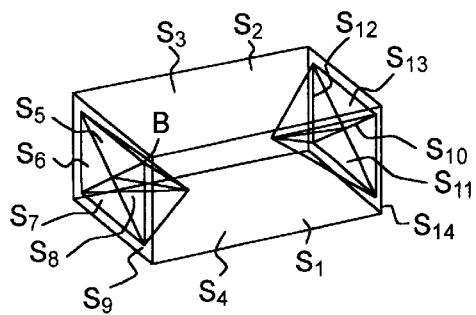
Figure 10E:
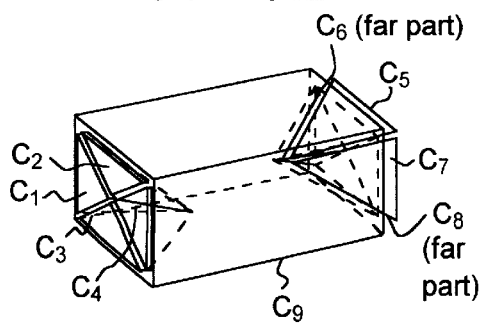

That is, first, if a face obtained in generating the surface model interferes with another face at a portion other than the edges, an interference edge shown by arrow B in FIG. 10(D) is generated. A three-dimensional closed region is obtained by the interference edge and the edges surrounding the boundary face of the surface model, and a volume V determined by the following equation (4) is applied to the obtained region to generate a cell.

$$V = \sum_{i=1}^{n} (\delta i - Ai - Di/3) \quad (4)$$

In this equation, n is the number of boundary faces. Ai represents the area of boundary faces, Di represents the distance between a boundary face and the origin, and δi represents the symbol of the inner product of the normal Ni of a boundary face determined to direct outwardly of the region and a position vector Pi of an arbitrary point on the boundary face.

Of the three-dimensional closed regions determined to have a negative volume, those having a volume the absolute value of which is maximum removed, because they are outermost cells having an infinite volume, and since other ones having a negative volume represent cavities, closed regions containing such closed regions and having a positive volume are obtained, and they are determined to be one three-dimensional cell. The remaining closed regions having a positive volume are determined to be three-dimensional cells having no cavity. The cells generated in this way are labeled C1, C2, and C3 .... When the cells are generated as described above, for instance, as shown in FIG. 10(E), a cell division model l is generated, which comprises four cells C1 to C4 on the left face side of the three-dimensional model, four cells C5 to C8 on the right face side which are similar to the four cells on the left face side, and a cell C9 within which the top ends of the cells (Cl to C8) reach.

The subroutine for the solid model synthesis process in step 300 shown in FIG. 2 will now be described using FIGS. 11 and 12. In the side view of the present embodiment, a set of line segments including all of the line segments of the "true side view" and thus a solution solid can always be obtained by combining the cell division models generated in the above step, 210. However, since there is a possibility that the side view contains excessive line segments, it is necessary to obtain a combination of cell division models by the Boolean equation described below on the condition that the top view and the front view are correct.

Figure 11:
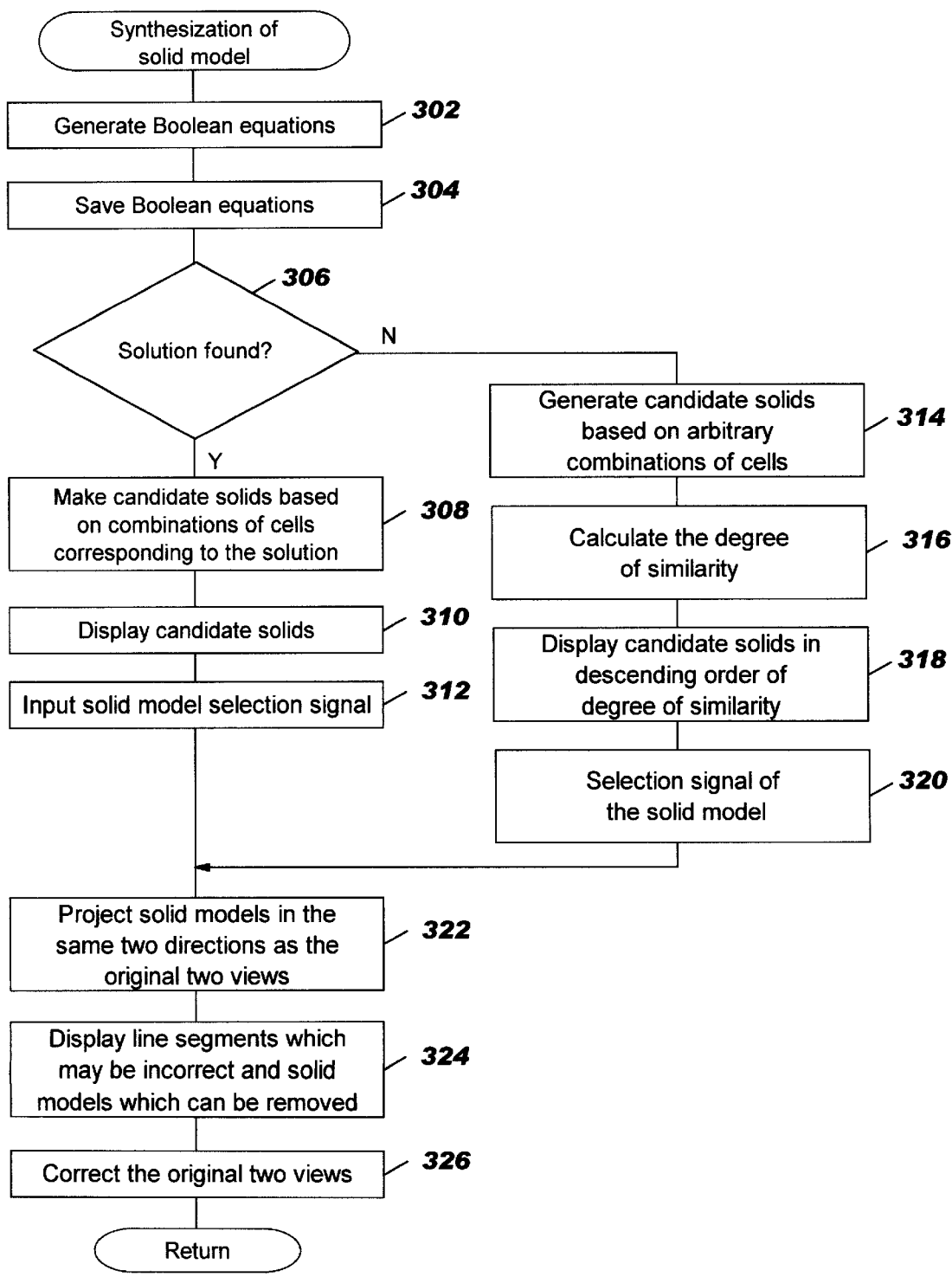
FIG. 11 is a flowchart showing the process for synthesizing a solid model.

Then, in step 302 shown in FIG. 11, the condition for the top and front views to be correct is generated by the Boolean equation. That is, the condition for which cell to be selected in order that the projection drawing of the solid model is in coincidence with the top and front views is obtained by the Boolean equation.

The procedure for making the Boolean equation is described below with reference to FIG. 12.

Figure 12:
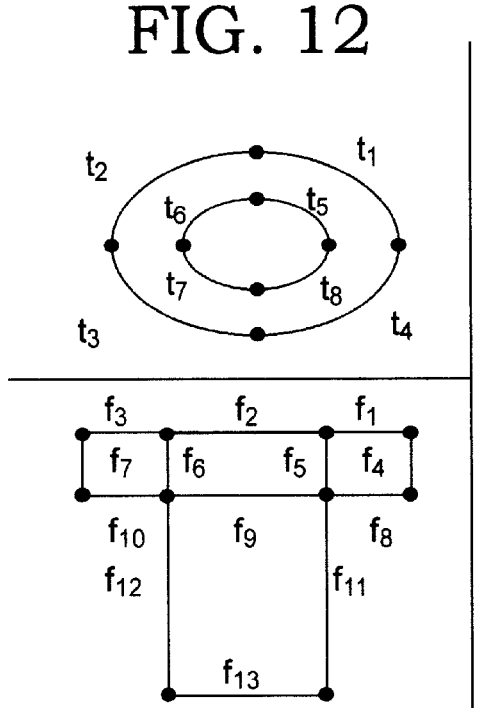
FIGS. 12(A), (B), (C), and (D) show the process for making Boolean equations.
Figure 12A:
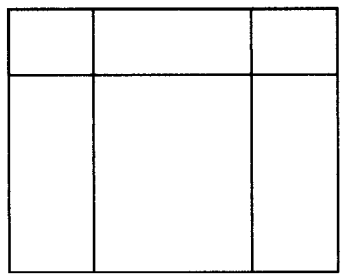
Figure 12B:
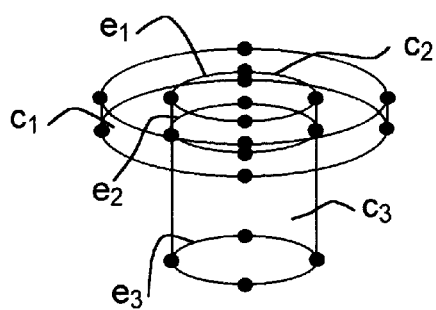

In the two views shown in FIG. 12 (A), ti and fi represent the line segments and the like of the top and front views, respectively. As shown in this FIG. 12 (A), the top view is made up of 8 curves, and the front view is made up of 13 line segments. FIG. 12 (A') represents a side view which is synthesized from the top and front views. Further, FIG. 12(B) is a cell division model generated from the top and front views, and the synthesized side view, in which ei represents an edge, and C1 represents a cell. The following description is given from the relationships between the respective line segments and the like of the top view (TOP) and the front view (FRONT):

$$\text{TOP}=[t1, t2, t8] \quad (5)$$

$$\text{FRONT}=[f1, f2, \ldots f13] \quad (6)$$

Here, it is assumed that the symbols ti and fi representing the respective line segments and the like of the two views are binary variables which are true when these line segments and the like are included in the projection drawing of a three-dimensional model which becomes the candidate for a solid model (hereafter referred to as a "candidate model"), otherwise false. In this case, the condition that, for instance, the top view of the two views is correct is given if all of t1, t2, ... t8 are valid as the edges of the candidate model. Accordingly, the condition that the top and front views of the two views are correct is given if all of the line segments and the like of the top view (TOP) and the front view (FRONT) are valid as the edges of the candidate model. Further, all of the line segments and the like of one drawing are valid as the edges of the candidate model if at least one of the sets [ei] of the edges of a cell division model corresponding to the line segments and the like of the particular drawing is valid as the edges of the candidate model. This is considered for a curve t6 in the top view of FIG. 12(A). Of the edges of the projection drawing of the cell division model, those corresponding to the curve t6 in the top view are three, namely, e1, e2, and e3, as shown in FIG. 12(B). Accordingly, the curve t6 is valid as an edge of the candidate model if at least one of the edges e1, e2, and e3 of the cell division model is an edge of the candidate model. Then, consideration is given to the condition for the edge e2 to become an edge of the candidate model. The cells adjacent to the edge e2 are C1, C2, and C3 as shown in FIG. 12(B). Eight combinations of these cells can be given, as shown in the following numeric expression 1:

$$(C_1 C_2 C_3), (\overline{C_1} C_2 C_3), (C_1 \overline{C_2} C_3), (C_1 C_2 \overline{C_3}),$$

$$(\overline{C_1} \overline{C_2} C_3), (\overline{C_1} C_2 \overline{C_3}), (C_1 \overline{C_2} \overline{C_3}), (\overline{C_1} \overline{C_2} \overline{C_3}) \quad \text{[Numeric expression 1]}$$

The designation shown in the following numeric expression 2 means that the cell Ci is not selected.

$$\overline{C}_1 \quad \text{[Numeric expression 2]}$$

For the third combination, the edge e2 is shared by four faces, and does not satisfy the condition for a solid model that every edge must be shared by two faces. Further, for the second and fourth combinations of cells, the edge e2 does not exist, and for the eighth combination of cells, all cells are not selected and the solid itself does not exist. In consequence, of the eight combinations in the numeric expression 1, the edge e2 appears as an edge of the candidate model in four combinations of the first, second, sixth and seventh. Accordingly, the condition for the edge e2 to be an edge of the candidate model is any of the four combinations of the first, second, sixth, and seventh, and thus it can be written as shown by the following numeric expression 3.

$$e_2 = \underline{C_1\,C_2\,C_3}\ U\bar{C_1}\,C_2\,C_3\ U\bar{C_1}\,C_2\,\bar{C_3}\ UC_1 \\ C_2\,C_3$$

[Numeric expression 3]

Further, the cells adjacent to the respective edges e1 and e3 are {C1m C2}, and {C3}, and if such relational expressions are also sought for the edges e1 and e3, those shown by the following numeric expression 4 are obtained:

$$e_1 = \bar{C_1}\,C_2\ UC_1\,\bar{C_2}$$

$$e_3 = C_3$$

[Numeric expression 4]

Accordingly, since the condition for the line segments and the like of the two views to be true is that any of the edges e1, e2, and e3 becomes an edge of the candidate model, it can be written as shown by the following numeric expression 5:

$$t_6 = e_1\ Ue_2\ Ue_3$$

$$= (C_1\,C_2\,C_3\ U\bar{C_1}\,C_2\,C_3\ U\bar{C_1}\,C_2\,\bar{C_3}\ UC_1\,\bar{C_2}\,\bar{C_3}\ U(\bar{C_1}\,C_2\ UC_1\,\bar{C_2}) \\ UC$$

$$= \bar{C_1}\,C_2\ UC_1\,\bar{C_2}\ UC_3$$

[Numeric expression 5]

Such combinations of cells for the line segments and the like of the two views to be valid as edges of the candidate model are determined for all line segments and the like of the two views.

Then, if all conditions are satisfied, the condition for all of the two views to be correct can be obtained as a combination of cells. For instance, the example in FIG. 12 becomes as shown by the following numeric expression 6:

$$\text{TOP} = C_1\,C_2\,C_3\ UC_1\bar{C_2}\ \bar{C3}$$

$$\text{FRONT} = \phi$$

[Numeric expression 6]

In consequence, the condition for the top and front views to be correct is as shown by the following numeric expression 7:

$$\text{TOP}|\text{FRONT} = \phi$$

[Numeric expression 7]

As shown above, in the example shown in FIG. 12, there exists no candidate model satisfying the condition for the top and front views to be correct.

Although different from the condition in this embodiment, the condition for at least one drawing of the top and front views for instance to be correct is as shown by the following numeric expression 8:

$$\text{TOP} \cup \text{FRONT} = C_1\,C_2\,C_3\ UC_1\,\bar{C_2}\,\bar{C_3}$$

[Numeric expression 8]

A candidate model which satisfies this condition becomes the candidate model based on the combination of the two cells. A candidate model corresponding to the left combination of cells is the candidate model in FIG. 12(C) which is generated by synthesizing the all cells, and that based on te right combination of cells is the candidate model of FIG. 12(D) of only the cell C1, because cells C2 and C3 are not selected.

In the next step, 304, the combination of cell can be determined by solving the above Boolean equations using an inference system. A three-dimensional model specified on the basis of the combination of cells is the candidate for the solid model to be sought. In the next step, 306, the boolean equations are solved to determine whether or not a solution exists and, if it exists, the process goes to step 308 to generate a candidate model which is determined by the combination of cells that satisfies the condition. In this case, an error exists in the two views, and thus, in the next step, 310, the line segments and the like which may be incorrect are characterized and displayed in the two views, and a solid model made by removing the line segments and the like is displayed.

Figure 12C:
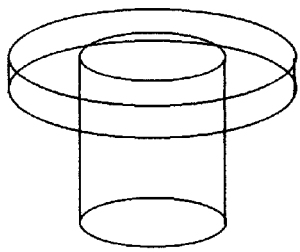
Figure 12D:
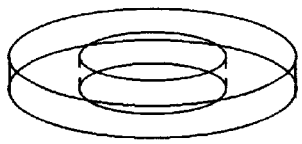
Figure 13:
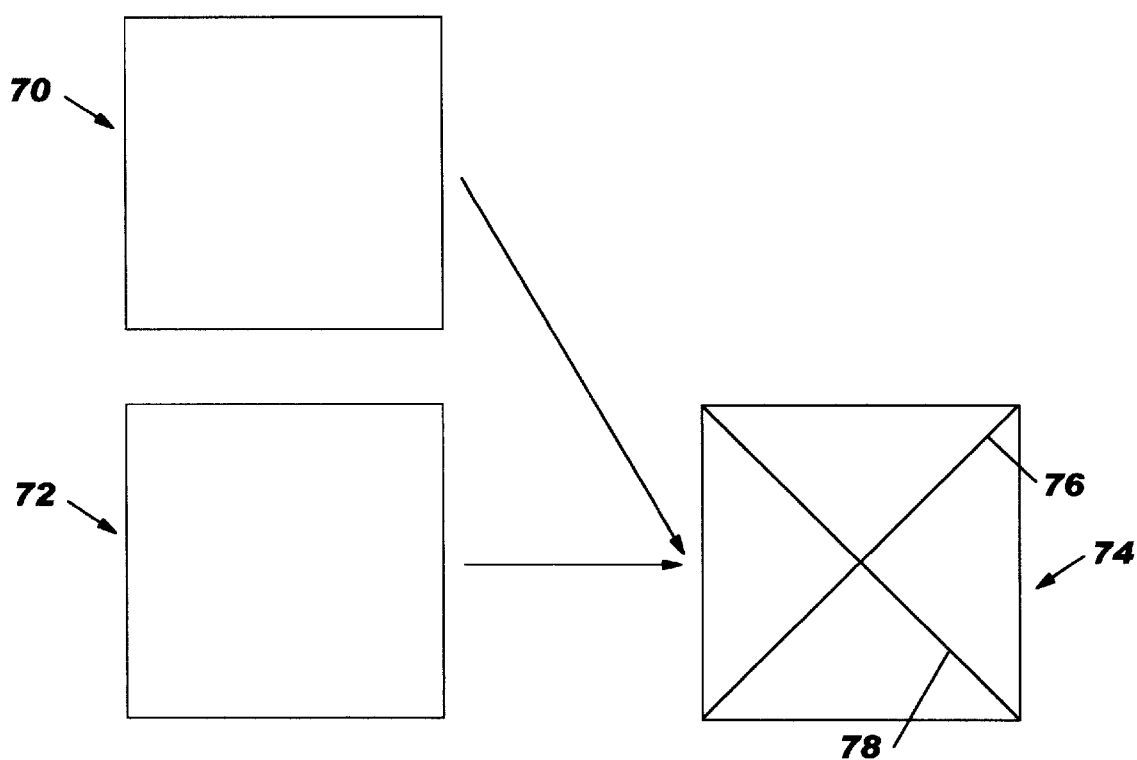
FIG. 13 explains the conventional method for extracting candidate line segments for a side view from a top view and a front view which are made by projecting a solid.

In addition, if a plurality of candidate model exists as in FIGS. 12(C) and 12(D), these are sequentially displayed. In the next step, 312, a solid model is selected by the operator from such plurality of existing candidate models, and the selection signal is input.

Further, if, in step 306, the Boolean equations are solved and it is determined that no solution exists, that is, if an error exists in all drawings of the two views, then, in step 314, a candidate model formed by an arbitrary combination of the above described cells is generated, and in the next step, 316, the candidate model is projected in the same two directions as the original two views to compare the candidate model with the original two views, whereby the degree of similarity dif (V, Mb) of the projection drawing Mb of the candidate model and the original two views V is determined. The degree of similarity dif (V, Mb) means the sum of the number N1 of the edges of the two views which are not in the candidate model and the number N2 of the edges of the candidate models which are not in the two views. If there are n cells, there are $2^n$ combinations of cells. For instance, if there are three cells as shown in FIG. 12(B), the combinations of cells include a case in which all the cells are selected, a case in which one or two cells are selected, and a case in which all cells are not selected, and thus there are $2^3$ or eight combinations, the sum of those cases. Such $2^n$ combinations of cells include a case in which all cells are not selected, and since it is the combination indicating that a solid model itself does not exist, there are existing $2^n-1$ candidate models. For the $2^n-1$ candidate models, the degree of similarity between the projection drawing of the candidate models and the original two views is determined, and in the next step, 318, the line segments and the like which may be incorrect are characterized and displayed in the two views in descending order of the degrees of similarity, and the particular candidate models are displayed.

In the next step, 320, of the plurality of candidate models displayed in descending order of the degree of similarity, a candidate model desired by the operator, that is, a candidate model having a degree of similarity larger than a predetermined value, in the present embodiment, which is the candidate model of the largest degree of similarity, is selected as a solid model, and its selection signal is input.

In the next step, 322, the solid model selected by the operator is projected onto the same two directions as the original two views and, in the next step, 324, the respectively projected three-dimensional shapes and the original two views are compared and the line segments and the like which may be incorrect are displayed along with the two views, and a solid model made by removing such line segments and the like is also displayed. In the next step, 326, the original two views are corrected so that the two views based on the coordinate data which is input after the removal of the wrong segments and the like become two complete views.

As apparent from the above description, since the extraction is performed after narrowing down the candidate line segments for the side view, only proper candidate line segments can be selected from the top and front views. Also, this enables the processing time of the extraction process to be shortened.

Further, a solid model can be synthesized from the top view, the front view, and the side view made by using the extracted proper candidate line segments. Also, this can prevent the number of solutions in the solid model synthesis process from becoming tremendously large, or can prevent the processing time from becoming abnormally long.

In addition, in the present embodiment, an example has been shown in which, by using two views consisting of a top view and a front view as original drawings, the candidate line segments for a side view are extracted from the two views to make the side view and a solid model is synthesized from the side view and the two views. However, the present invention is not limited to the use of the two views consisting of the top and front views as the original views, but it can apply to a case in which two drawings of a plurality of drawings whose planes of projection are perpendicular to each other, for instance, the side view and the front view, or the side view and the top view are used.

Advantages of the Invention

As described above, the drawing candidate line segment extraction system and the drawing candidate line segment extraction method of the present invention have an excellent advantage that only proper candidate line segments can be extracted from a first drawing and a second drawing.

Further, in accordance with the solid model synthesis system and the solid model synthesis method of the present invention, a solid model can be synthesized from a first drawing, a second drawing, and a third drawing made by using extracted proper candidate line segments. Also, this produces an excellent advantage that the number of solutions in the solid model synthesis process can be prevented from becoming tremendously large, or the processing time can be prevented from becoming abnormally long.

What is claimed is:

1. A drawing candidate line segment extraction system for extracting, from a first drawing and a second drawing which are made by projecting a solid onto two planes perpendicular to each other, candidate line segments which are candidates for line segments forming a third drawing made by projecting said solid onto a plane perpendicular to each of said two planes, said drawing candidate line segment extraction system comprising:

coordinate extraction means for extracting two-dimensional coordinates of the points corresponding to vertices of said solid in each of said first and second drawings:

candidate vertices generation means for comparing the values of said two-dimensional coordinates extracted by said coordinate extraction means from said first drawing and said two-dimensional coordinates extracted by said coordinate extraction means from said second drawing and, if the values of one said two-dimensional coordinate are determined to be equal in said first and second drawings, generating the combination of said values of said respective two-dimensional coordinates of candidate vertices in said third drawing; and, candidate line segment extraction means for extracting the line segments formed by connecting two said candidate vertices as candidate line segments for said third drawing in at least one of the following cases:
  (a) If said line segments formed by connecting two candidate vertices are horizontal or vertical in said third drawing. and line segments corresponding to said line segments exist in said first and second drawings, and
  (b) if said line segments formed by connecting two candidate vertices are not horizontal or vertical in said third drawing, and the segments corresponding to said line segments exist in said first and second drawings, and the line segments existing in said first and second drawings are not horizontal or vertical.

2. The drawing candidate line segment extraction system as claimed in claim 1 wherein said first and second drawings are a top view and a front view, respectively.

3. A solid model synthesis system comprising:

coordinate extraction means for extracting two-dimensional coordinates of the points corresponding to vertices of a solid in each of a first drawing and a second drawing that are made by projecting said solid onto two planes perpendicular to each other;

candidate vertices generation means for comparing the values of said two-dimensional coordinates extracted by said coordinate extractions; means from said first drawing and said two-dimensional coordinates extracted by said coordinate extraction means from said second drawing and, if the values of one said two-dimensional coordinate are determined to be equal in said first and second drawings, generating the combination of said values of said respective two-dimensional coordinates as candidate vertices in a third drawing; and, candidate line segment extraction means for extracting the line segments formed by connecting two said candidate vertices s candidate line segments for said third drawing in at least one of the following cases;
  (a) when said line segments formed by connecting two candidate vertices are horizontal or vertical in said third drawing, and line segments corresponding to said line segments exist In said first and second drawing, or
  (b) when said line segments formed by connecting two candidate vertices are not horizontal or vertical in said third drawing. and line segments corresponding to said line segments exist in said first and second drawings, and the line segments existing In said first and second drawings are not horizontal or vertical.

4. The solid model synthesis system as claimed in claim 5 wherein said first and second drawings are a top view and a front view, respectively.

5. A drawing candidate segment extraction method for extracting, from a first drawing and a second drawing which are made by projecting a solid onto two planes perpendicular to each other. candidate line segments for forming a third drawing made by projecting said solid onto a plane perpendicular to each of said two planes, said drawing candidate line segment extraction method comprising the steps of:

extracting two-dimensional coordinates of the points corresponding to vertices of said solid in each of said first and second drawings;

generating candidate vertices by comparing the values of said extracted two-dimensional coordinates from said first drawing and said extracted two-dimensional coordinates from said second drawing and, if the values of one said two-dimensional coordinate are determined to be equal in said first and second drawings, generating the combination of said values of said respective two-dimensional coordinates of candidate vertices in said third drawing; and extracting the line segments formed by connecting two candidate vertices as candidate line segments for said third drawing in at least one of the following cases:
  (a) when said line segments formed by connecting two candidate vertices are horizontal or vertical in said third drawing, and line segments corresponding to said line segments exist in said first and second drawings, or
  (b) when said fine segments formed by connecting two candidate vertices are not horizontal or vertical in said third drawing, and line segments corresponding to said line segments which are not horizontal or vertical exist in said first and second drawings.

6. The drawing candidate line segment extraction method as claimed in claim 5 wherein said first and second drawings are a top view and a front view, respectively.

7. A solid model synthesis method comprising:

extracting two-dimensional coordinates of the points corresponding to vertices of a solid in each of a first drawing and a second drawing that are made by projecting said solid onto two planes perpendicular to each other;

generating candidate vertices by comparing the values of said extracted two-dimensional coordinates from said first drawing and said extracted two-dimensional coordinates from said second drawing and, if the values of one said two-dimensional coordinate are determined to be equal in said first and second drawings, generating the combination of said values of said respective two-dimensional coordinates of candidate vertices in a third drawing; and, extracting the line segments formed by connecting two candidate vertices as candidate line segments for said third drawing in at least one of the following cases:
  (a) when said line segments formed by connecting two candidate vertices are horizontal or vertical in said third drawing, and line segments corresponding to said line segments exist in said first and second drawings, or
  (b) when said line segments formed-by connecting two candidate vertices are not horizontal or vertical in said third drawing, and line segments corresponding to said line segments which are not horizontal or vertical exist in said first and second drawings.

8. The solid model synthesis method as claimed in claim 7 wherein said first and second drawings are a top view and a front view, respectively.

* * * * *